United States Patent
Noh et al.

(10) Patent No.: US 11,005,556 B2
(45) Date of Patent: May 11, 2021

(54) APPARATUS AND METHOD FOR SELECTING UPLINK TRANSMISSION BEAMS IN WIRELESS COMMUNICATION SYSTEM

(71) Applicant: Samsung Electronics Co., Ltd., Gyeonggi-do (KR)

(72) Inventors: Jeehwan Noh, Suwon-si (KR); Hyunil Yoo, Suwon-si (KR); Taeyoung Kim, Seoul (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

Patent file contains an affidavit/declaration under 37 CFR 1.130(b).

(21) Appl. No.: 15/782,770

(22) Filed: Oct. 12, 2017

(65) Prior Publication Data
US 2018/0102827 A1 Apr. 12, 2018

(30) Foreign Application Priority Data
Oct. 12, 2016 (KR) .................. 10-2016-0132153

(51) Int. Cl.
*H04B 7/08* (2006.01)
*H04W 72/04* (2009.01)
(Continued)

(52) U.S. Cl.
CPC .......... *H04B 7/088* (2013.01); *H04B 7/0404* (2013.01); *H04B 7/0452* (2013.01);
(Continued)

(58) Field of Classification Search
CPC .... H04B 7/088; H04B 7/0404; H04B 7/0452; H04B 7/0695; H04B 7/0617;
(Continued)

(56) References Cited

U.S. PATENT DOCUMENTS

| 9,077,467 | B2 | 7/2015 | Shi et al. | |
| 2010/0232534 | A1* | 9/2010 | Lee | H04B 7/043 375/267 |
| 2016/0192255 | A1* | 6/2016 | Tsuda | H04W 16/08 370/331 |
| 2016/0212790 | A1* | 7/2016 | Fujishiro | H04W 76/16 |

(Continued)

FOREIGN PATENT DOCUMENTS

WO  WO-2016198123 A1 * 12/2016 ........... H04B 7/0408

OTHER PUBLICATIONS

Gao, et al.; "Measured Propagation Characteristics for Very-Large MIMO at 2.6 GHz"; 2012 Conference Record of the Forty Sixth Asilomar Conference on Signals, Systems and Computers (ASILOMAR); Pacific Grove, California, USA; Nov. 4-7, 2012; 6 pages.

(Continued)

*Primary Examiner* — Omar J Ghowrwal
*Assistant Examiner* — Kokou R Detse

(57) ABSTRACT

The present disclosure relates to a pre-5$^{th}$-generation (5G) or 5G communication system to be provided for supporting higher data rates beyond 4$^{th}$-generation (4G) communication system such as long term evolution (LTE). Disclosed is an apparatus of a base station (BS). The BS may be configured to determine whether to use a beam of the BS and a beam of a terminal, which have been used in a downlink, in an uplink based on capability information received from the terminal and whether an antenna of the BS used for communication with the terminal is a transmission/reception common antenna and perform an uplink beam search when it is determined that the beam of the BS or the beam of the terminal is not used in the uplink.

16 Claims, 14 Drawing Sheets

(51) Int. Cl.
- *H04B 7/06* (2006.01)
- *H04B 7/0404* (2017.01)
- *H04L 25/02* (2006.01)
- *H04B 7/0452* (2017.01)
- *H04W 72/02* (2009.01)
- *H04W 24/02* (2009.01)

(52) U.S. Cl.
CPC ....... *H04B 7/0695* (2013.01); *H04L 25/0204* (2013.01); *H04L 25/0224* (2013.01); *H04W 72/02* (2013.01); *H04W 72/046* (2013.01); *H04W 72/048* (2013.01); *H04B 7/0617* (2013.01); *H04W 24/02* (2013.01)

(58) Field of Classification Search
CPC .......... H04L 25/0204; H04L 25/0224; H04W 72/02; H04W 72/046; H04W 72/048; H04W 24/02
USPC ........................................................ 370/329
See application file for complete search history.

(56) References Cited

U.S. PATENT DOCUMENTS

| | | | |
|---|---|---|---|
| 2017/0164310 A1* | 6/2017 | Jeong | H04W 56/0045 |
| 2017/0207843 A1* | 7/2017 | Jung | H04W 74/006 |
| 2018/0097560 A1* | 4/2018 | Jalali | H04W 28/0236 |
| 2018/0103492 A1* | 4/2018 | Akkarakaran | H04W 74/0833 |

OTHER PUBLICATIONS

Hugl et al.; "Spatial Reciprocity of Uplink and Downlink Radio Channels in FDD Systems"; Cost 273 TD(02) 066; Espoo, Finland; May 30-31, 2002; 7 pages.

Samsung; "Impact of Beam/Channel Reciprocity for NR"; 3GPP TSG RAN WG1 #86 bis; R1-1609082; Lisbon, Portugal; Oct. 10-14, 2016; 4 pages.

Imtiaz, S.; "Uplink-Based Downlink Beamforming in Frequency Division Duplex Systems"; Master's Thesis, Department of Electrical and Information Technology, Faculty of Engineering, LTH, Lund University; Jun. 2014; 55 pages.

* cited by examiner

APPARATUS AND METHOD FOR SELECTING UPLINK TRANSMISSION BEAMS IN WIRELESS COMMUNICATION SYSTEM

CROSS-REFERENCE TO RELATED APPLICATION AND CLAIM OF PRIORITY

This application is related to and claims priority to 10-2016-0132153 filed on Oct. 12, 2016, the contents of which are incorporated herein by reference.

TECHNICAL FIELD

The present disclosure relates generally to a beam search. More particularly, the present disclosure relates to an apparatus and a method for searching for a beam based on an antenna in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a beamforming operation through antennas, a beam search procedure for transmitting a plurality of beamformed reference signals is performed to select beams. Meanwhile, in data transmission, the channel estimation operation for transmitting reference signals is performed for proper precoding. However, the operation for transmitting the plurality of beamformed reference signals or the operation for transmitting the reference signals may delay data transmission time. Accordingly, in order to efficiently transmit data, a method of simplifying the beam search procedure or the channel estimation procedure is required.

SUMMARY

To address the above-discussed deficiencies, it is a primary object to provide an apparatus and a method for effectively performing a beam search in a wireless communication system.

The present disclosure provides an apparatus and a method for performing a beam search based on a procedure determined according to the antenna configuration in the wireless communication system.

The present disclosure provides an apparatus and a method for determining whether to perform an uplink beam search according to the antenna configuration in the wireless communication system.

The present disclosure provides an apparatus and a method for determining a range of beams to be used for the uplink beam search based on downlink beams in the wireless communication system.

The present disclosure provides an apparatus and a method for simplifying a beam search procedure or a channel estimation procedure by determining whether a BS or a terminal uses a transmission/reception common antenna in the wireless communication system.

In accordance with an aspect of the present disclosure, an apparatus of a Base Station (BS) may include at least one transceiver and at least one processor. The at least one processor may be configured to determine whether to use a beam of the BS and a beam of a terminal, which have been used in a downlink, in an uplink based on capability information received from the terminal and whether an antenna of the BS used for communication with the terminal is a transmission/reception common antenna and performs an uplink beam search when it is determined that the beam of the BS or the beam of the terminal is not used in the uplink.

In accordance with another aspect of the present disclosure, an apparatus of a terminal may include at least one transceiver and at least one processor. The at least one transceiver may be configured to transmit capability information of the terminal to a Base Station (BS), receive a control message indicating an operation mode for an uplink beam search from the BS, and perform the uplink beam search according to the operation mode. The operation mode may be determined based on whether a beam of the BS used in a downlink can be used in an uplink and the capability information of the terminal.

In accordance with another aspect of the present disclosure, a method of operating a BS may include: determining whether to use a beam of the BS and a beam of a terminal, which have been used in a downlink, in an uplink based on capability information received from the terminal and whether an antenna of the BS used for communication with the terminal is a transmission/reception common antenna; and performing an uplink beam search when it is determined that the beam of the BS or the beam of the terminal is not used in the uplink.

In accordance with another aspect of the present disclosure, a method of operating a terminal may include: transmitting capability information of the terminal to a BS; receiving a control message indicating an operation mode for an uplink beam search from the BS; and performing the uplink beam search according to the operation mode. The operation mode may be determined based on whether a beam of the BS used in a downlink can be used in an uplink and whether a beam of the terminal used in a downlink can be used in an uplink.

Through an apparatus and a method according to various embodiments of the present disclosure, it is possible to simplify a beam search procedure or a channel estimation procedure based on beam correspondence or channel reciprocity according to whether a transmission/reception common antenna is used or not.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
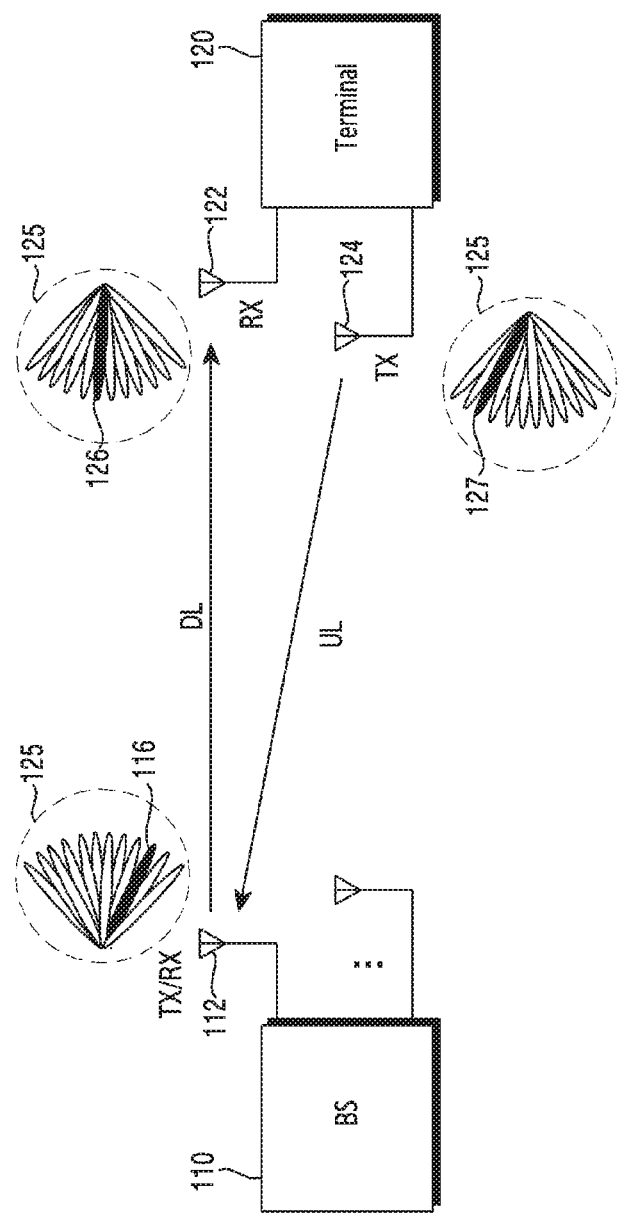
FIG. 1 illustrates a wireless network environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, singular forms may include plural forms as well unless the context clearly indicates otherwise. The expression "a first," "a second," "the first," or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to," For example, the phrase "processor adapted (or configured) to perform A, B, and C" may mean a dedicated processor (e.g., embedded processor) only for performing the corresponding operations or a generic-purpose processor (e.g., central processing unit (CPU) or Application Processor (AP)) that can perform the corresponding operations by executing one or more software programs stored in a memory device.

The present disclosure relates to an apparatus and a method for performing a beam search in a wireless communication system. More specifically, the present disclosure describes technology for performing a beam search through a procedure corresponding to an antenna structure in a wireless communication system.

The term referring to channel information used in the following description, the term referring to network entities, and the term referring to an element of the device are employed for convenience of description. Accordingly, the present disclosure is not limited to the following terms and other terms having the same technical meaning may be used.

In the following description, channel reciprocity refers to property that an uplink channel and a downlink channel have similar characteristics, in other words, channel attributes to handle an uplink channel response to be equal to a downlink channel response. Through the channel reciprocity, a downlink channel response can be acquired using an uplink channel response or an uplink channel response can be acquired using a downlink channel response. Similarly, beam reciprocity refers to a property that an uplink beam and a downlink beam have correspondence (i.e. similar characteristics), in other words, beam attributes that an uplink beam direction is handled to be correspond (i.e. equal) to a downlink beam direction. The beam reciprocity may be referred to as beam correspondence. Through the beam correspondence, a beam used in the uplink can be used in the downlink or a beam used in the downlink can be used in the uplink. In channel estimation or beam tracking, when antennas used for data transmission and antennas used for data reception are the same as each other, the antennas are regarded as the same spatial resources and thus using the reciprocity is considered. In this specification, whether antennas of a base station or a terminal are transmission/reception common antennas and the relation for channel reciprocity or beam correspondence will be described.

FIG. 1 illustrates a wireless network environment according to various embodiments of the present disclosure.

Referring to FIG. 1, the wireless network environment may be a wireless network environment 100.

The wireless network environment 100 may include a base station (BS) 110 and a terminal 120. According to the type of network, the BS 110 may be referred to as "access point (AP)", "eNodeB (eNB)", or 5th generation nodeB (5G node), transmission reception point (TRP) as well as the "base station (BS)." Hereinafter, for convenience of description, the BS 110 may be used for referring to network infrastructure elements that provide radio access to remote terminals in this patent document. Further, according to the type of network, the terminal 120 may be referred to as "mobile station," subscriber station," "remote terminal," "wireless terminal," or "user device" as well as a user equipment (UE),"

The wireless network environment 100 includes a downlink corresponding to a link from the BS 110 to the terminal 120 and an uplink corresponding to a link from the terminal 120 to the BS 110.

The BS 110 may include a plurality of antennas. The BS 110 may include an antenna 112. Through the antenna 112, the BS 110 may perform both transmission through the downlink and reception through the uplink. That is, the antenna 112 may be a transmission/reception (TX/RX) common antenna. The terminal 120 may include at least one antenna. The terminal 120 may include a reception antenna 122 and a transmission antenna 124. In the following description, although the reception antenna 122 and the transmission antenna 124 are spaced apart from each other by a predetermined distance, the present disclosure is not limited thereto.

The BS 110 may transmit downlink data to the terminal 120 through the antenna 112. In order to transmit the downlink data, the BS 110 may select a downlink transmission beam 116 among a plurality of BS beams 115. The terminal 120 may receive the downlink data through the reception antenna 122. In order to receive the downlink data, the terminal 120 may select a downlink reception beam 126 among a plurality of terminal beams 125.

The terminal 120 may transmit uplink data through the transmission antenna 124. In order to transmit the uplink data, the terminal 120 may determine an uplink transmission beam among the plurality of terminal beams 125. When the transmission antenna 124 and the reception antenna 122 are located within a predetermined distance from each other, the terminal 120 may determine the beam, which has been used for reception of the downlink data, as the uplink transmission beam. When the transmission antenna 124 and the reception antenna 122 are located within a predetermined distance from each other and implemented as one antenna, the terminal 120 may also determine the beam, which has been used for reception of the downlink data, as the uplink transmission beam. The terminal 120 may use a beam search result in the downlink for the beam search procedure. In other words, the terminal 120 may use beam correspondence (beam reciprocity) to determine the uplink transmission beam. However, when the transmission antenna 124 and the reception antenna 122 are spaced apart from each other by a predetermined distance or longer, the terminal 120 may determine that it is difficult to consider the downlink reception beam as the uplink transmission beam. That is, the terminal 120 may determine that it is difficult to use the beam correspondence. Accordingly, as illustrated in the example of FIG. 1, the terminal 120 may determine the uplink transmission beam 127 among the plurality of terminal beams by performing the beam search procedure for the uplink.

The BS 110 may receive the uplink data through the antenna 112. In order to receive the uplink data, the terminal 120 may determine the uplink reception beam among the plurality of BS beams 112. At this time, as the transmission antenna and the reception antenna are implemented as one antenna 112, the BS 110 may determine that beam correspondence can be used. The BS 120 may determine the downlink transmission beam 116 as the uplink reception beam. Accordingly, the BS 110 may omit the beam search procedure for determining the uplink reception beam.

Meanwhile, according to a communication environment, the BS 110 may convert an estimation result of an uplink channel to estimate a downlink channel or convert an estimation result of a downlink channel to estimation an uplink channel. In other words, according to the communication environment, the BS 110 may determine whether to use the channel reciprocity. For example, the communication environment may include a time division duplex (TDD) communication environment or a frequency division duplex (FDD) communication environment, and partial resources (for example, antennas) used for data transmission.

When downlink antennas (the transmission antenna of the BS 110 and the reception antenna of the terminal) and uplink antennas (the reception antenna of the BS and the transmission antenna of the terminal) are not the same, it may be determined that the use of channel reciprocity is not possible due to spatial division of the antennas. For example, the antenna 112 is the transmission reception common antenna but the antennas in the terminal side are divided into the reception antenna 112 and the transmission antenna 124 as illustrated in FIG. 1, so that the BS 110 may determine that it is difficult to use channel reciprocity. After performing the uplink channel estimation, the BS 110 may have difficulty in applying the converted result of the uplink channel estimation to downlink data transmission. Accordingly, the BS 110 is required to perform separate compensation or transmit a separate reference signal (for example, a cell-specific reference signal (CRS), channel state information-reference signal (CSI-RS), or demodulation-RS (DM-RS)) for the downlink channel estimation.

Although not illustrated in FIG. 1, when the downlink antennas and the uplink antennas are the same, the channel reciprocity can be used. When uplink transmission and downlink transmission are performed using different time resources in the same frequency band, the BS may apply the channel estimation result in the uplink to precoding in downlink data transmission. That is, the BS may transmit downlink data without an operation of transmitting a separate reference signal or receiving a feedback on channel status information (CSI) or a compensation procedure.

Although FIG. 1 illustrates that the antenna of the BS 110 corresponds to the transmission/reception common antenna and the antennas of the terminal 120 are divided into the transmission antenna and the reception antenna, this is only an example for describing beam correspondence and channel reciprocity and the present disclosure is not limited thereto. Accordingly, the BS 110 according to various embodiments of the present disclosure may not include the transmission/reception common antenna. In other words, the BS 110 may include a transmission antenna and a reception antenna that are physically separated from each other. Further, the terminal 120 may include a transmission/reception common antenna instead of the divided reception antenna and transmission antenna.

Figure 2:
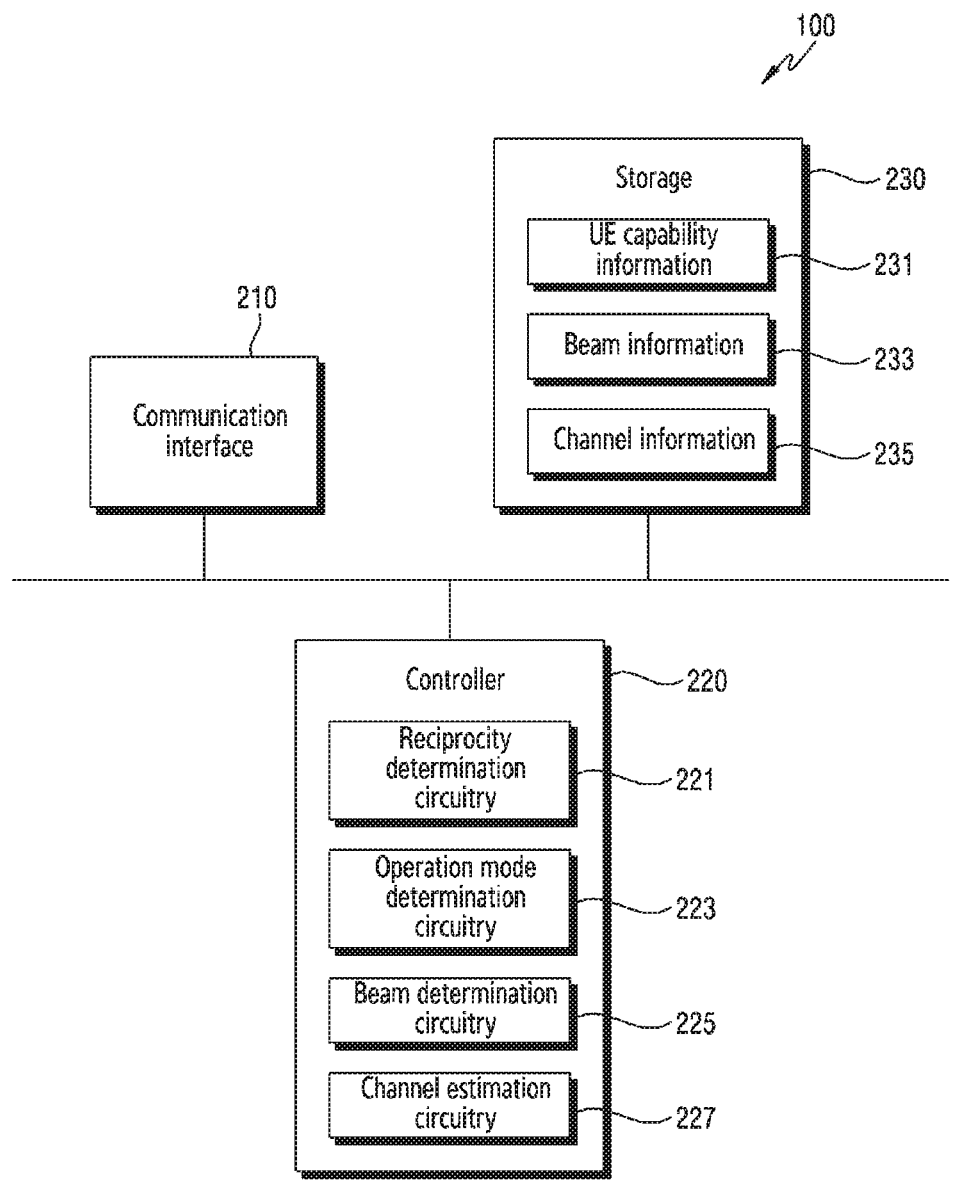
FIG. 2 illustrates an example of the functional configuration of a BS according to various embodiments of the present disclosure.
Figure 3:
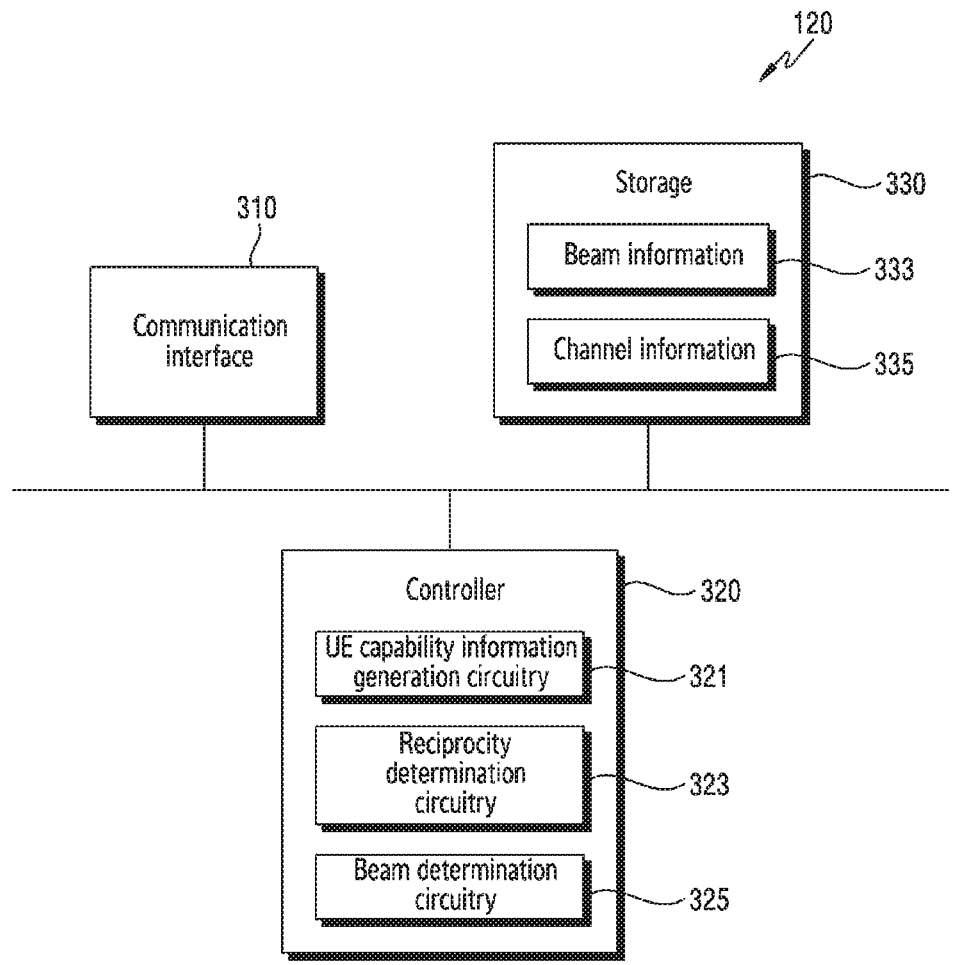
FIG. 3 illustrates an example of the functional configuration of a terminal according to various embodiments of the present disclosure.
Figure 4:
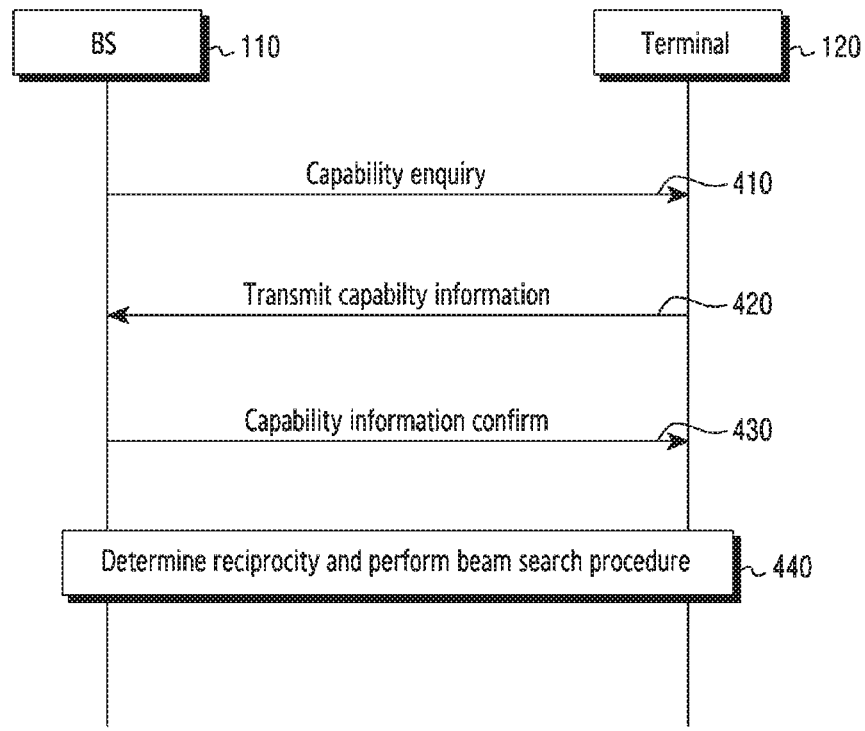
FIG. 4 illustrates a negotiation process of UE capability information according to various embodiments of the present disclosure.

The operations of the BS 110 and the terminal 120 may be divided into a beam search step using beam correspondence and a channel estimation step using channel reciprocity. FIG. 2 illustrates the general operation of the BS 110, FIG. 3 illustrates the general operation of the terminal 120, and FIG. 4 illustrates the operations before the beam search by the BS 110 and the terminal 120. Thereafter, the beam search procedure using beam correspondence will be described with reference to FIGS. 5 to 9. The channel estimation using channel reciprocity will be described with reference to FIGS. 10 to 12.

Hereinafter, for convenience of description, the case in which the beam, which has been used in the downlink, is used in the uplink will be described as an example of the beam search procedure based on beam correspondence, but the case in which the beam, which has been used in the uplink, is used in the downlink can be also applied.

FIG. 2 illustrates an example of the functional configuration of the BS according to various embodiments of the present disclosure. The BS may be the BS 110 of FIG. 1. The term " . . . unit" or the ending of a word, such as " . . . or," " . . . er," or the like may indicate a unit of processing at least one function or operation, and this may be embodied by hardware, software, or a combination of hardware and software.

Hereinafter, terms required for describing various embodiments will be defined in FIG. 2. The terms referring to control information used in the following description, the terms for calculation states (for example, a mode and an operation), the terms referring to data (for example, information or a value), the terms referring to network entities, the terms referring to messages (for example, an enquiry and a signal), and the terms referring to elements of the device are employed for convenience of description. Accordingly, the present disclosure is not limited to the following terms and other terms having the same technical meaning may be used.

Referring to FIG. 2, the BS 110 may include a communication interface 210, a controller 220, and a storage 230.

The communication interface 210 may perform functions for transmitting a signal through a wireless channel. For example, the communication interface 210 may perform a function of conversion between a baseband signal and a bitstream according to a physical layer standard of a system. For example, when data is transmitted, the communication interface 210 may encode and modulate a transmission bitstream so as to generate complex symbols. Also, when data is received, the communication interface 210 may decode and demodulate a baseband signal so as to restore a reception bitstream. The communication interface 210 may up-convert the baseband signal into a radio frequency (RF) band signal and transmit the up-converted signal through an antenna. The communication interface 210 may down-convert an RF band signal received through an antenna to a baseband signal. For example, the communication interface 210 may include a transmission filter, a reception filter, an amplifier, a mixer, and oscillator, a digital analog converter (DAC), an analog digital converter (ADC), and the like. When a plurality of antennas is provided, the communication interface 210 may include a plurality of RF chains.

According to some embodiments, the communication interface 210 may include a transmission/reception common antenna. In this case, the communication interface 210 may use the same antenna configuration in the transmission operation and the reception operation. The antenna configuration may include elements required for analog control of the antenna, such as a low noise amplifier (LNA), a coupler, and an antenna type (for example, antenna array). In other embodiments, the communication interface 210 may include a transmission antenna and a reception antenna separated from each other. In this case, the communication interface 210 may include each of the antenna configuration for the transmission antenna and the antenna configuration for the reception antenna.

The communication interface 210 may transmit various reference signals. For example, the communication interface 210 may perform the beam search procedure in order to discover a beam having the good transmission or reception performance in beamforming. For the beam search procedure, the communication interface 210 may transmit a plurality of reference signals. The reference signals may be transmitted after being beamformed, and accordingly, referred to as beam reference signals or beam refinement reference signals. In another example, the communication interface 210 may transmit at least one of a CRS, a CSI-RS, and a DM-RS in the channel estimation operation. The communication interface 210 may receive feedback information from the terminal 120 in response to the various reference signals.

The communication interface 210 may receive various reference signals. For example, when searching for a beam used in the uplink, that is, an optimal or preferred uplink beam, the communication interface 210 may receive reference signals. The reference signals may be transmitted after being transmission-beamformed by the terminal 120, and may be reception-beamformed by the communication interface 210. In another example, when the uplink channel estimation is performed, the communication interface 210 may receive an uplink DM-RS. In yet another example, the communication interface 210 may receive an uplink sounding reference signal (SRS) in the channel estimation for scheduling and link adaptation according to the uplink channel. The communication interface 210 may transmit feedback information to the terminal 120 in response to the various reference signals as necessary.

The communication interface 210 may be used to negotiate UE capability information with the terminal 120. The communication interface 210 may be used to request the UE capability information in an initial access procedure with the terminal 120. That is, the communication interface 210 may transmit a UE capability information enquiry message to the terminal 120. The communication interface 210 may receive the UE capability information from the terminal 120 in response to the enquiry message. The UE capability information may be UE capability information 231. In some embodiments, the UE capability information 231 may contain information for determining whether beam correspondence or channel reciprocity can be used. For example, the UE capability information 231 may contain at least one piece of first information indicating whether the antennas of the terminal 120 are divided into the transmission antenna and the reception antenna, second information indicating whether the terminal 120 can use beam correspondence, and third information indicating whether the terminal 120 can use channel reciprocity.

The communication interface 120 may transmit a control message to the terminal 120. The control message may indicate an operation mode determined by the controller 220. Through the control message, the communication interface 210 may indicate, to the terminal 120, the operation mode in which the terminal 120 may perform the beam search and the method by which the uplink transmission beam of the terminal 120 may be determined. The control message may be transmitted through high layer signaling with the terminal 120 or transmitted through downlink control information (DCI).

The communication interface 210 may receive a compensation value for antenna separation from the terminal 120. The compensation value for the antenna separation may be a compensation value for compensating for a reciprocity error (for example, path error) attributable to the separation between the transmission antenna 124 of the terminal 120 and the reception antenna 122 of the terminal 120.

The controller 220 may include a reciprocity determination circuitry 221, an operation mode determination circuitry 223, a beam determination circuitry 225, and a channel estimation circuitry 227. In the beam search procedure using beam correspondence, the controller 220 may use the reciprocity determination circuitry 221, the operation mode determination circuitry 223, and the beam determination circuitry 225. In the channel estimation using channel reciprocity, the controller 220 may use the reciprocity determination circuitry 221 and the channel estimation circuitry 227. Hereinafter, the operation of the controller 220 for channel reciprocity will be described after the operation of the controller 220 for beam correspondence.

The reciprocity determination circuitry 221 may determine whether the use of beam correspondence is possible. The reciprocity determination circuitry 221 may determine whether the BS 110 can use beam correspondence and the terminal 120 can use beam correspondence.

The reciprocity determination circuitry 221 may determine whether the BS 110 can use beam correspondence. The reciprocity determination circuitry 221 may determine whether the BS 110 can use beam correspondence according to whether the antenna of the BS 110 used for communication with the terminal 120 is the transmission and/or reception common antenna.

In some embodiments, when the antenna of the BS 110 is the transmission/reception common antenna, there is no difference in the location between the antenna for transmission and the antenna for reception, so that the reciprocity determination circuitry 221 may determine that beam correspondence can be used.

In other embodiments, when the antenna of the BS 110 is not the transmission/reception common antenna, the reciprocity determination circuitry 221 may determine whether beam correspondence can be used according to the location of the antenna for transmission and the location of the antenna for reception. For example, the reciprocity determination circuitry 221 may determine whether beam correspondence can be used according to the distance between the antenna used for the downlink transmission beam and the antenna used for the uplink reception beam. When the antenna used for the downlink transmission beam and the antenna used for the uplink reception beam are separated from each other by a predetermined distance or more, the reciprocity determination circuitry 221 may determine that beam correspondence cannot be used in determination of the uplink reception beam. On the other hand, when the antenna used for the downlink transmission beam and the antenna used for the uplink reception beam are separated from each other by a distance shorter than the predetermined distance, the reciprocity determination circuitry 221 may determine that beam correspondence can be used in determination of the uplink reception beam. The location of each of the antennas may be considered at the moment when the BS 110 is designed, and thus the BS 110 may store in advance information related to the location of each of the antennas.

The reciprocity determination circuitry 221 may determine whether the terminal 120 can use beam correspondence. The reciprocity determination circuitry 221 may determine whether the terminal 120 can use beam correspondence based on UE capability information received from the terminal 120.

In some embodiments, the UE capability information may contain first information indicating whether the antenna of the terminal 120 is the transmission/reception common antenna. When the first information indicates that the antenna of the terminal 120 is the transmission/reception common antenna, the reciprocity determination circuitry 221 may determine that beam correspondence can be used in the beam determination of the terminal 120. On the other hand, when the first information indicates that the transmission antenna of the terminal 120 and the reception antenna of the terminal 120 are separated from each other, the reciprocity determination circuitry 221 may determine whether beam correspondence can be used in the beam determination of the terminal 120 through a separate procedure.

In other embodiments, the UE capability information may contain second information indicating whether beam correspondence can be used in the beam determination of the terminal 120. That is, the reciprocity determination circuitry 221 may determine whether the terminal 120 can use beam correspondence according to the content contained in the second information regardless of the first information. When it is not determined whether the terminal 120 can use beam correspondence based on the first information, analyzing the second information by the reciprocity determination circuitry 221 is useful.

The operation mode determination circuitry 223 may determine the operation mode for a beam determination process of the BS 110 and the terminal 120 based on the result of the performance by the reciprocity determination circuitry 221. When beam correspondence can be used for both the BS 110 and the terminal 120, the operation mode determination circuitry 223 may control the terminal 120 to determine the uplink reception beam of the BS 110 as the downlink transmission beam and determine the uplink transmission beam of the terminal 120 as the downlink reception beam. Accordingly, the BS 110 may not be required to perform a separate beam search procedure for determining the uplink beam. As described above, the operation mode in which the uplink reception beam and transmission beam are determined without the beam search procedure may be referred to as a reciprocity operation mode.

When the terminal 120 can use beam correspondence but the BS 110 cannot use beam correspondence, the operation mode determination circuitry 223 may determine that the BS 110 and the terminal 120 operate in a first operation mode for searching for the uplink reception beam of the BS 110.

When the terminal 120 cannot use beam correspondence but the BS 110 can use beam correspondence, the operation mode determination circuitry 223 may determine that the BS 110 and the terminal 120 operate in a second operation mode for searching for the uplink transmission beam of the terminal 120.

When beam correspondence can be used for neither the terminal 120 nor the BS 110, the operation mode determination circuitry 223 may determine that the BS 110 and the terminal 120 operate in a third operation mode for searching for the uplink transmission beam of the terminal 120 and the uplink reception beam of the BS 110.

After determining the operation mode of the BS 110 and the terminal 120, the operation mode determination circuitry 223 may generate a control message in order to inform the terminal 120 of the determination operation mode. The operation mode determination circuitry 223 may control the communication interface 210 to transmit the control message.

The beam determination circuitry 225 may determine the beam according to the operation mode determined by the operation mode determination circuitry 223. When the determination operation mode is a reciprocity operation mode, the beam determination circuitry 225 may determine that the beam used for downlink transmission of the BS 110 is the beam to be used for uplink reception of the BS 110. More specifically, the beam determination circuitry 225 may use the beam in the same direction or the same index as that of the beam used for downlink data transmission for uplink data reception.

When the determined operation mode is the first operation mode, the beam determination circuitry 225 may perform the beam search procedure for selecting the uplink reception beam of the BS 110. At this time, the terminal 120 may determine the uplink transmission beam as the downlink reception beam according to a control message indicating the first operation mode. The terminal 120 may fix the determined uplink transmission beam. The beam determination circuitry 225 may perform a procedure for searching for an uplink reception beam based on the fixed uplink transmission beam. Though different uplink reception beams, the beam determination circuitry 225 may receive a plurality of reference signal transmitted through the fixed uplink transmission beam. The beam determination circuitry 225 may select one beam according to a reference signal quality of the plurality of reference signals. For example, the signal quality may be a received signal strength Index (RSSI), reference signal received power (RSRP), or a reference signal received quality (RSRQ). The beam determination circuitry 225 may determine the selected one beam as the uplink reception beam.

When the determined operation mode is the second operation mode, the beam determination circuitry 225 may determine the beam used for downlink transmission of the BS 110 as the beam to be used for uplink reception of the BS 110. Thereafter, the beam determination circuitry 225 may receive reference signals from the terminal 120 and transmit a feedback to the terminal 120 so as to perform an uplink transmission beam determination procedure of the terminal 120.

When the determined operation mode is the third operation mode, the beam determination circuitry 225 may perform the beam search procedure for selecting the uplink reception beam of the BS 110. At this time, unlike the first operation mode, the terminal 120 may transmit a plurality of reference signals through uplink transmission beams according to the control message. Through difference uplink reception beams, the beam determination circuitry 225 may receive the plurality of reference signals transmitted through different uplink transmission beams. The beam determination circuitry 225 may measure a quality of each of the plurality of received reference signals and generate feedback information. The beam determination circuitry 225 may select one beam among the plurality of reference signals according to the measured quality. The beam determination circuitry 225 may determine the selected one beam as the uplink reception beam. The beam determination circuitry 225 may control the communication interface 210 to transmit the feedback information. The terminal 120 may determine the uplink transmission beam based on the feedback information.

The reciprocity determination circuitry 221 may determine whether channel reciprocity can be used. Whether the channel reciprocity can be used may be determined based on whether the terminal 120 uses the transmission and/or reception common antenna and the BS 110 uses the transmission/reception common antenna. Further, whether the channel reciprocity can be used may be determined further based on the distance between the transmission antenna and the reception antenna that are separated from each other.

When the antenna of the BS 110 used for communication with the terminal 120 is the transmission/reception common antenna, the reciprocity determination circuitry 221 may determine that the BS 110 can use channel reciprocity. On the other hand, when the antenna of the BS 110 is not the transmission/reception common antenna, the reciprocity determination circuitry 221 may determine that the BS 110 cannot use channel reciprocity.

When the UE capability information received from the terminal 120 indicates that the antenna of the terminal 120 is the transmission and/or reception common antenna, the reciprocity determination circuitry 221 may determine that the terminal 120 can use channel reciprocity. On the other hands, when the UE capability information indicates that the antennas of the terminal 120 are divided into the antenna for transmission and the antenna for reception, the reciprocity determination circuitry 221 may determine that the terminal 120 cannot use channel reciprocity.

When both the BS 110 and the terminal 120 can use channel reciprocity, the reciprocity determination circuitry 221 may determine that channel reciprocity is satisfied. On the other hand, when at least one of the BS 110 and the terminal 120 cannot use channel reciprocity, the reciprocity determination circuitry 221 may determine that channel reciprocity is not satisfied.

When both the BS 110 and the terminal 120 can use channel reciprocity, the channel estimation circuitry 227 may perform precoding based on an uplink channel estimation result without a separate downlink channel estimation operation and transmit downlink data.

However, when at least one of the BS 110 and the terminal 120 cannot use channel reciprocity, the BS 110 may be required to perform an operation of transmitting a reference signal (for example, a CSI, a CSI-RS, or a DM-RS) or an operation of calibrating the uplink channel estimation result for separate downlink channel estimation to transmit downlink data. For example, the channel estimation circuitry 227 may control the communication interface 210 to transmit the reference signal for the downlink channel estimation. In another example, the channel estimation circuitry 227 may perform a compensation operation for the downlink channel estimation. The compensation operation may include an operation of determining a BS compensation value for compensating for channel reciprocity when the BS 110 cannot use channel reciprocity, and an operation of receiving a terminal compensation value for compensating for channel reciprocity from the terminal 120 when the terminal 120 cannot use channel reciprocity.

The storage 230 may store the UE capability information 231. The storage 230 may store the UE capability information 231 received from the terminal 120. The UE capability information 231 may contain at least one piece of first information indicating whether the terminal 120 includes the transmission/reception common antenna, second information indicating the terminal 120 can use beam correspondence, and third information indicating whether the terminal 120 can use channel reciprocity.

The storage 230 may store beam information 233. The storage 230 may store the beam information 233 that is information on the beam used by the BS 110 for downlink communication with the terminal 120. For example, the beam information 233 may be an index indicating the used beam. In another example, the beam information 233 may be a parameter indicating the used beam. The parameter may be at least one of a parameter (for example, a precoding matrix indicator (PMI)) for digital beamforming and a parameter (for example, a phase value) for analog beamforming.

The storage 230 may store channel information 235. The storage 235 may store the channel information 235 that is the channel estimation result acquired by the BS 110 in uplink communication with the terminal 120. For example, the channel information 235 may be a channel matrix for the uplink channel. In another example, the channel information 235 may be a parameter (for example, channel state information (CSI)) or a precoding matrix) related to precoding applied to the uplink channel.

FIG. 3 illustrates an example of the functional configuration of the terminal according to various embodiments of the present disclosure. The terminal may be the terminal 120 of FIG. 1.

Referring to FIG. 3, the terminal 120 may include a communication interface 310, a controller 320, and a storage 330.

The communication interface 310 may perform functions similar to those of the communication interface 210 of FIG. 2. According to some embodiments, the communication interface 310 may include a transmission/reception common antenna. In this case, the communication interface 310 may use the same antenna configuration in the transmission operation and the reception operation. In other embodiments, the communication interface 310 may include each of a transmission antenna and a reception antenna. In this case, the communication interface 310 may use separate antenna configurations in the transmission operation and the reception operation.

The communication interface 310 may transmit UE capability information to the BS 110. When the terminal 120 performs an initial access procedure with the BS 110, the communication interface 310 may transmit the UE capability information. The communication interface 310 may transmit the UE capability information to the BS 110 in response to a request for the UE capability information from the BS 110.

The communication interface 310 may receive a control message from the BS 110. The communication interface 310 may transmit uplink reference signals for a beam search procedure according to an operation mode indicated by the received control message. The communication interface 310 may transmit uplink data through a transmission beam of the terminal 120 determined according to the operation mode indicated by the control message.

The communication interface 310 may transmit a compensation value for antenna separation of the terminal 120 to the BS 110. The compensation value for the antenna separation may be a compensation value for compensating for a reciprocity error according to the separation between the transmission antenna 124 of the terminal 120 and the reception antenna 122 of the terminal 120.

The controller 320 may include a UE capability information generation circuitry 321, a reciprocity determination circuitry 323, and a beam determination circuitry 325.

The UE capability information generation circuitry 321 may generate UE capability information in response to a UE capability information enquiry request received from the BS 110. The UE capability information generation circuitry 321 may generate the UE capability information based on whether the transmission antenna and the reception antenna of the terminal 120 are separated from each other, whether the terminal 120 can use beam correspondence, and whether the terminal 120 can use channel reciprocity. According to various embodiments, the terminal 120 may provide information on whether beam correspondence is satisfied to the BS 110 through the UE capability information. Whether the transmission antenna and the reception antenna of the terminal 120 are separated from each other may be determined at the moment when the terminal 120 is designed or manufactured, so that the corresponding information may be stored in advance. The reciprocity determination circuitry 323 may determine whether beam correspondence can be used in beam determination of the terminal 120. The reciprocity determination circuitry 323 may determine whether beam correspondence can be used regardless of reception of the control message indicating the operation mode. For example, when the antenna of the terminal 120 is the transmission and/or reception common antenna, the reciprocity determination circuitry 323 may determine that the terminal 120 can use beam correspondence. In another example, when the antennas of the terminal 120 are implemented to be separated into the transmission antenna and the reception antenna, the reciprocity determination circuitry 323 may determine whether the terminal 120 can use beam correspondence according to the distance between the transmission antenna and the reception antenna.

The reciprocity determination circuitry 323 may determine whether the terminal 120 can use channel reciprocity in the channel estimation. When the antenna of the terminal 120 is the transmission and/or reception common antenna, the reciprocity determination circuitry 323 may determine that the terminal 120 can use channel reciprocity. In this case, the terminal 120 may not determine a compensation value for antenna separation in the channel estimation. On the other hand, when the antenna of the terminal 120 is implemented to be separated into the transmission antenna and the reception antenna, the reciprocity determination circuitry 323 may determine that the terminal 120 cannot use channel reciprocity. In this case, the terminal 120 may determine the compensation value for antenna separation in the channel estimation.

The beam determination circuitry 325 may determine the beam according to the operation mode indicted by the control message received from the BS 110. When the determined operation mode is a reciprocity operation mode, the beam determination circuitry 325 may determine the beam used in the downlink of the terminal 120 as the uplink transmission beam of the BS 120. More specifically, the beam determination circuitry 325 may control the communication interface 310 to use the beam having the same direction or the same index as that of the beam used for downlink data reception for uplink data transmission.

When the determined operation mode is a first operation mode, the beam determination circuitry 325 may determine the beam selected by the downlink beam procedure of the terminal 120 as the uplink transmission beam. Thereafter, the beam determination circuitry 325 may transmit a plurality of reference signals so that the BS 110 determines the uplink reception beam. Here, the reference signals are transmitted after being beamformed by the communication interface 310.

When the determined operation mode is a second operation mode, the beam determination circuitry 325 may perform a beam search procedure for selecting the uplink transmission beam of the terminal 120. The terminal 120 may transmit a plurality of reference signals to select the uplink transmission beam. At this time, the reference signals are transmitted after being beamformed using different transmission beams by the communication interface 310. The BS 110 may receive the plurality of reference signals based on the uplink reception beam having the same direction as that of the downlink transmission beam and transmit feedback information to the terminal 120 in response to the reception. The terminal 120 may determine the uplink transmission beam of the terminal 120 based on the feedback information received from the BS 110.

When the determined operation mode is a third operation mode, the beam determination circuitry 325 may perform the beam search procedure for selecting the uplink transmission beam of the terminal 120. At this time, unlike the second operation mode, the terminal 120 may transmit a plurality of reference signals without fixing the uplink transmission beam of the terminal 120 according to the control message. That is, the reference signals are transmitted after being beamformed using different transmission beams by the communication interface 310. Through different uplink reception beams, the BS 110 may receive the plurality of reference signals transmitted through different uplink transmission beams. The BS 110 may select one of the plurality of received reference signals and determine the uplink reception beam corresponding to the selected reference signal as the uplink reception beam to be used for data transmission. The beam determination circuitry 325 may determine the uplink transmission beam of the terminal 120 based on feedback information corresponding to the plurality of transmitted reference signals.

Although FIG. 3 illustrates that the controller 320 of the terminal 120 does not include a channel estimation circuitry, the present disclosure is not limited thereto. That is, for channel estimation, the terminal 120 may transmit reference signals for uplink channel estimation according to a request from the BS 110 and transmit feedback information to the BS 110 in response to the reference signals received from the BS 110.

The storage 330 may store beam information 333. The storage 330 may store the beam information 333 that is information on the beam used by the terminal 120 for downlink communication with the BS 110. The beam information 333 may be an index indicating the used beam or a beamforming parameter indicating the beam.

The storage 330 may store channel information 335. The storage 335 may store the channel information 335 that is the channel estimation result acquired by the terminal 120 in uplink communication with the BS 110. The channel information 335 may be a parameter indicating an uplink channel response, channel state information for the uplink channel, or a precoding matrix.

FIG. 4 illustrates a negotiation process of UE capability information according to various embodiments of the present disclosure.

Referring to FIG. 4, in step 410, the BS 110 may transmit a UE capability enquiry message that makes a request for UE capability information to the terminal 120. The UE capability enquiry message may be a message that makes a request for capability information of the terminal 120 related to a radio access network (RAN) between the BS 110 and the terminal 120. The UE capability enquiry message may be transmitted through a logical channel of a dedicated control channel (DDCH).

In step 420, the terminal 120 may transmit UE capability information to the BS 110. To this end, the terminal 120 may generate the UE capability information. More specifically, the terminal 120 may generate the UE capability information containing at least one of information on antenna capability and reciprocity capability as well as information on RF capability, transport channel capability, physical channel capability, secure capability, measurement capability.

The information on the antenna capability may include information on the antenna configuration of the terminal 120. In some embodiments, the information on the antenna configuration may include information on whether the terminal 120 uses the transmission/reception common antenna or information on whether the antenna of the terminal 120 is implemented to be separated into the transmission antenna and the reception antenna. In other embodiments, the information on the antenna configuration may include information on the distance between the antenna used for uplink reception of the terminal 120 and the antenna used for downlink transmission.

The information on the reciprocity capability may include information on beam correspondence or information on channel reciprocity. The information on the beam correspondence may be information indicating whether the terminal 120 can use beam correspondence. In other words, the information on the beam correspondence may indicate whether the downlink beam can be used as the uplink beam. In some embodiments, the information on the beam correspondence may be configured by 1 bit and may directly indicate whether the terminal 120 can use beam correspondence (in other words, whether beam correspondence is satisfied). In other embodiments, the information on the beam correspondence may be configured by multiple bits and may include information indicating candidate beams related to the used beam. The candidate beams may be beams adjacent to the used beam. In this case, the BS 110 may determine various operation modes in consideration of a range of the adjacent beams.

The information on the channel reciprocity may be information indicating whether the terminal 120 can use channel reciprocity. In other words, the information on the channel reciprocity may indicate whether an estimation value for the downlink channel may be used as an estimation value for the uplink channel. More specifically, the information on the channel reciprocity may be information indicating whether a transmission path within the terminal 120, that is, an analog control path before the signal is transmitted to the air is different for the uplink channel and the downlink channel. In some embodiments, the information on the channel reciprocity may be configured by 1 bit and may directly indicate whether the terminal 120 can use channel reciprocity. In other embodiments, the information on the channel reciprocity may be configured by multiple bits and may indicate whether the terminal 120 can use channel reciprocity and also include information indicating a parameter for determining a compensation value when channel reciprocity cannot be used.

In step 430, the BS 110 may store the UE capability information in response to transmission of the UE capability information and transmit an acknowledgement message of the UE capability information to the terminal 120. The UE capability information and the acknowledgement message may be transmitted through a logical channel of a DCCH.

In step 440, the BS 110 and the terminal 120 may perform the reciprocity determination and the beam search procedure. The BS 110 may determine the operation mode for the beam search procedure based on the UE capability information. Herein, the operation mode represents the configuration of the beam search procedure, such as a target of beam sweeping required for the beam search, the number of beam sweepings, and a separate beam search for the uplink. The BS 110 and the terminal 120 may select each of the uplink reception beam and the uplink transmission beam according to the determined operation mode.

According to various embodiments, the terminal 120 may transmit the UE capability information after a radio resource control (RRC) connection procedure as illustrated in FIG. 4. For example, after a random access procedure, the terminal 120 may report the UE capability information containing information on beam correspondence to the BS 110.

Although not illustrated in FIG. 4, the BS 110 and the terminal 120 may perform a downlink beam search procedure for determining the downlink transmission beam and the downlink reception beam. For example, the downlink beam search procedure may be performed before a capability negotiation procedure (for example, step 410, step 420, or step 430). Alternatively, the downlink beam search procedure may be performed after the capability negotiation procedure of the terminal 120. Here, the downlink beam search procedure may include steps in which the BS 110 transmits reference signals along with transmission beamforming and the terminal 120 receives the reference signals along with reception beamforming and transmits feedback information.

Hereinafter, a detailed process of the beam correspondence determination, the operation mode determination, and the beam search procedures that are performed in step 440 will be described with reference to FIGS. 5 to 9.

Figure 5:
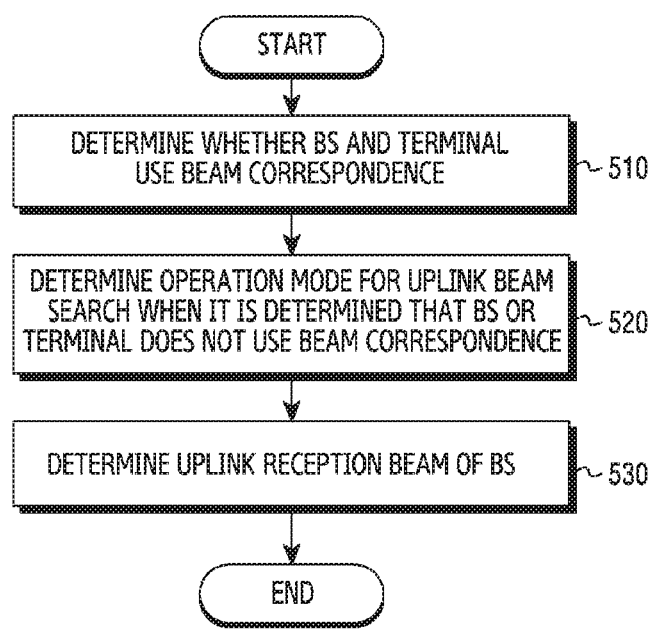
FIG. 5 illustrates a flowchart of a process for beam determination by the BS according to various embodiments of the present disclosure.

FIG. 5 is a flowchart illustrating a process of the beam determination by the BS according to various embodiments of the present disclosure. The BS may be the BS 110 of FIG. 1.

Referring to FIG. 5, in step 510, the BS 110 may determine whether the BS and the terminal use beam correspondence based on UE capability information and whether the antenna of the BS 110 is the transmission/reception common antenna.

The BS 110 may determine whether the terminal 120 can use beam correspondence based on the UE capability information. The UE capability information may contain first information on the antenna configuration of the terminal 120 or second information on beam correspondence of the terminal 120. In some embodiments, when the first information indicates that the antenna of the terminal 120 is the transmission/reception common antenna, the BS 110 may determine that the terminal 120 can use beam correspondence. In other embodiments, when the second information directly indicates that the terminal 120 cannot use beam correspondence, the BS 110 may immediately determine that the terminal 120 cannot use beam correspondence.

The BS 110 may determine whether beam correspondence can be used based on a system type used for communication with the terminal 120. In some embodiments, when the communication system with the terminal 120 is TDD, the BS 110 may determine that beam correspondence can be used. In other embodiments, when the communication type with the terminal 120 is FDD, the BS 110 may determine that beam correspondence can be used. For example, when a bandwidth between the DL and the UL is not larger than a predetermined threshold value, the BS 110 may determine the best uplink reception beam based on the best downlink transmission beam. The bandwidth may be a guard bandwidth.

The BS 110 may determine whether the BS 110 can use beam correspondence based on whether the antenna of the BS 110 used for communication (for example, downlink) with the terminal 120 is the transmission/reception common antenna. For example, when the antenna of the BS 110 is the transmission/reception common antenna, there is no distance difference between the antenna used for transmission and the antenna used for reception, so that it may be determined that the BS 110 can use beam correspondence. In another example, when the antenna of the BS 110 used in the downlink is the transmission-dedicated antenna, the BS 110 may determine whether the BS 110 can use beam correspondence through a separate procedure. The BS 110 may determine whether beam correspondence can be used according to the distance between the transmission antenna and the reception antenna. The distance between the transmission antenna and the reception antenna may be acquired from information recorded at the manufacturing moment or a parameter according to the design, and the BS 110 may determine whether beam correspondence can be used according to pre-stored values.

In step 520, when the BS 110 determines that the BS 110 or the terminal 120 does not use beam correspondence, the BS 110 may determine an operation mode for the uplink beam search. According to whether the BS 110 can use beam correspondence and whether the terminal 120 can use beam correspondence, four cases may be derived. When both the BS 110 and the terminal 120 can use beam correspondence, the BS 110 may determine the downlink transmission beam as the uplink reception beam, and the terminal 120 may determine the downlink reception beam as the uplink transmission beam. That is, the beam search procedure for searching for the transmission beam and the reception beam used in the uplink may not be required. The BS 110 may determine the operation mode of the BS 110 and the terminal 120 as a reciprocity operation mode.

When it is determined that the BS 110 or the terminal 120 cannot use beam correspondence, the uplink beam search is required and thus the BS 110 may determine the operation mode for the uplink beam search. For example, when only the BS 110 cannot use beam correspondence, the BS 110 may determine a first operation mode for selecting the uplink reception beam. In another example, when only the terminal 120 cannot use beam correspondence, the BS 110 may determine a second operation mode for selecting the uplink transmission beam. In yet another example, when neither the BS 110 nor the terminal 120 can use beam correspondence, the BS 110 may determine a third operation mode for determining both the uplink transmission beam and the uplink reception beam.

In step 530, the BS 110 may determine the uplink reception beam of the BS 110 to be used in the uplink. In the case of operation mode in which the BS 110 can use beam correspondence (for example, the second operation mode), the BS 110 may determine the downlink transmission beam used in the downlink ad the uplink reception beam. On the other hand, in the case of operation mode in which the BS 110 cannot use beam correspondence (for example, the first operation mode or the third operation mode), the BS 110 may determine the uplink reception beam based on reference signals received from the terminal 120. The reference signals are transmitted from the terminal 120 to the BS 110 in order to determine the uplink beam. The BS 110 may receive the reference signals through a plurality of reception beams, respectively. The BS 110 may select one beam among the plurality of reception beams based on a reception quality or reception power of the corresponding reference signal. The BS 110 may determine the selected beam as the uplink reception beam. The BS 110 may perform uplink communication with the terminal 120 through the uplink reception beam.

Figure 6:
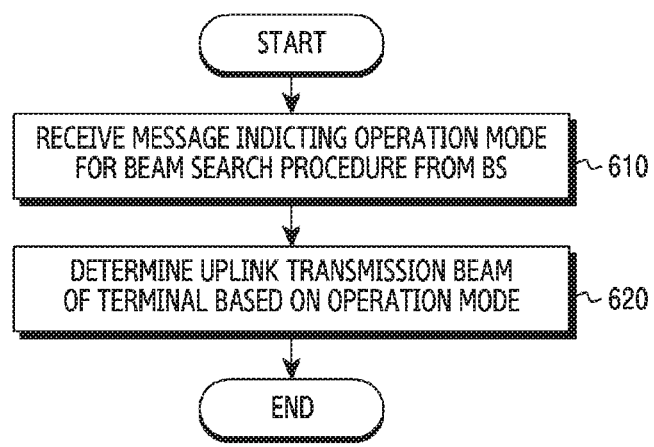
FIG. 6 illustrates a flowchart of a process of beam determination by the terminal according to various embodiments of the present disclosure.

FIG. 6 is a flowchart illustrating a process of the beam determination by the terminal according to various embodiments of the present disclosure. The terminal may be the terminal 120 of FIG. 1.

Referring to FIG. 6, in step 610, the terminal 120 may receive a message indicating an operation mode for a beam search procedure from the BS 110. The operation mode may indicate one of a first operation mode, a second operation mode, and a third operation mode that require the beam search procedure, and a reciprocity operation mode that determines the beam without any beam search procedure.

In step 620, the terminal 120 may determine an uplink transmission beam of the terminal 120 to be used in the uplink based on the determined operation mode. For example, in the case of first operation mode or reciprocity operation mode, the terminal 120 may determine a downlink reception beam as the uplink transmission beam. In another example, in the case of second operation mode or third operation mode, the terminal 120 may determine the uplink transmission beam through the beam search procedure.

More specifically, in the case of second operation mode or third operation mode, the terminal 120 may transmit reference signals to the BS 110. At this time, the reference signals are beamformed using a plurality of transmission beams. The terminal 120 transmits the reference signals to the BS 110 in order to determine the uplink beam. The terminal 120 may receive feedback information from the BS 110 and determine the uplink transmission beam based on the feedback information. The feedback information may contain measurement results of a plurality of transmission beams or indicate selection for the best transmission beam by the BS 110.

Figure 7:
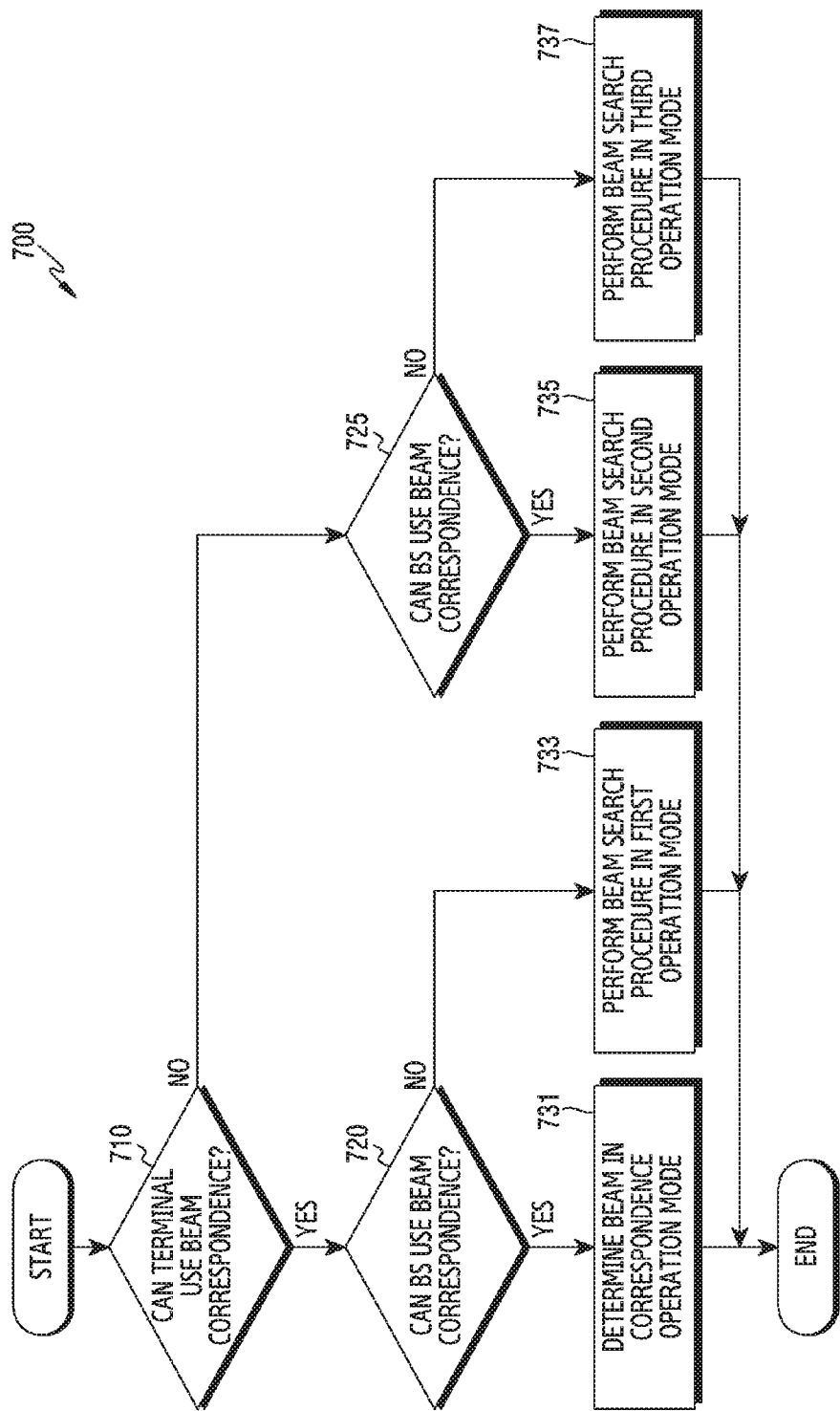
FIG. 7 illustrates an example of the determination of operation modes according to various embodiments of the present disclosure.

FIG. 7 illustrates an example of the determination of operation modes according to various embodiments of the present disclosure. Hereinafter, although FIG. 7 illustrates that the BS 110 first determines whether the terminal 120 can use beam correspondence and then determine whether the BS 110 can use beam correspondence, the present disclosure is not limited thereto. That is, unlike the order illustrated in FIG. 7, it may be first determined whether the BS 110 can use beam correspondence.

Referring to FIG. 7, in step 710, the BS 110 may determine whether the terminal 120 can use beam correspondence in the beam selection of the terminal 120. Whether the terminal 120 can use beam correspondence may be determined based on UE capability information received from the terminal 120.

Thereafter, in steps 720 and 725, the BS 110 may determine whether the BS 110 can use beam correspondence in the beam selection of the BS 110. Whether the BS 110 can use beam correspondence may be determined according to predetermined information (for example, antenna design, distance, separation range, and antenna array) and the antenna used for communication with the terminal 120.

The BS 110 may determine four operation modes according to the determination on whether the BS 110 can use beam correspondence and whether the terminal 120 can use beam correspondence. When both the BS 110 and the terminal 120 can use beam correspondence, the BS 110 may determine the operation mode as the reciprocity operation mode. When only the terminal 120 can use beam correspondence, the BS 110 may determine the operation mode as the first operation mode. When only the BS 110 can use beam correspondence, the BS 110 may determine the operation mode as the second operation mode. When neither the BS 110 nor the terminal 120 can use beam correspondence, the BS 110 may determine the operation mode as the third operation mode. The four operation modes are shown in Table 1 below.

TABLE 1

|  | BS can use beam correspondence | BS cannot use beam correspondence |
| --- | --- | --- |
| Terminal can use beam correspondence | Reciprocity operation mode | First operation mode |
| Terminal cannot use beam correspondence | Second operation mode | Third operation mode |

The BS 110 may inform the terminal 120 of the determined operation mode among the four operation modes through a control message. In some embodiments, the BS 110 may transmit the control message to the terminal 120 through higher layer signaling. In other embodiments, the BS 110 may transmit the control message through separate DCI. That is, the control message may be transmitted through a data channel or a control channel. For example, the control message may contain information of 2 bits in order to indicate four operation modes.

When the reciprocity operation mode is determined, the BS 110 and the terminal 120 are not required to perform a separate beam search procedure. Accordingly, in the uplink, the BS 110 and the terminal 120 may use the beams, which have been used in the downlink.

When one of the first operation mode to the third operation mode is determined, the BS 110 and the terminal 120 may be required perform the beam search procedure. At this time, the BS 110 may allocate resources (for example, subframe) for the uplink beam search procedure to the terminal 120. In some embodiments, the BS 110 may allocate a semi-static or periodic subframe to the terminal 120 through higher layer signaling. In other embodiments, the BS 110 may dynamically or aperiodically allocate the subframe to the terminal 120 through DCI.

The BS 110 may allocate resources for the uplink beam search procedure according to the determined operation mode. For example, when the first operation mode is determined as the operation mode, the BS 110 may allocate N subframes (or symbols) for reference signal transmission to the terminal 120. On the other hand, in the case of third operation mode, reference signal transmission for searching for the larger number of beams is required than the case of first operation mode, the BS 110 may allocate M (>N) subframes (or symbols) for reference signal transmission to the terminal 120.

Although one of the two beams (for example, uplink transmission beam and uplink reception beam) is determined according to beam correspondence, the BS 110 and the terminal 120 may transmit and/or receive a control message or feedback information to determine the other beam. In the first operation mode or the third operation mode, the BS 110 may determine the reception beam to be used in the uplink based on reference signals received from the terminal 120 in the beam search procedure. In the second operation mode, the terminal 120 may determine the transmission beam to be used in the uplink based on feedback information on reference signals received from the BS 110 in the beam search procedure.

Although FIG. 7 illustrates that the control message indicates one of the four operation modes, the control message may indicate one of the three operation modes except for the reciprocity operation mode. That is, since the terminal 120 may perform the operation of the terminal 120 corresponding to the reciprocity operation mode regardless of the control message, the control message may be generated to indicate only the three operation modes.

Hereinafter, the first operation mode to the third operation mode will be described in detail with reference to FIGS. 8A to 8C. As described above, although FIGS. 8A to 8C illustrate an example in which beams used in the downlink are used in the uplink, the present disclosure is not limited thereto. In the embodiment for using the beams, which have been used in the uplink, in the downlink, entities that perform the operations for the beam search between the BS and the terminal may be changed.

Figure 8A:
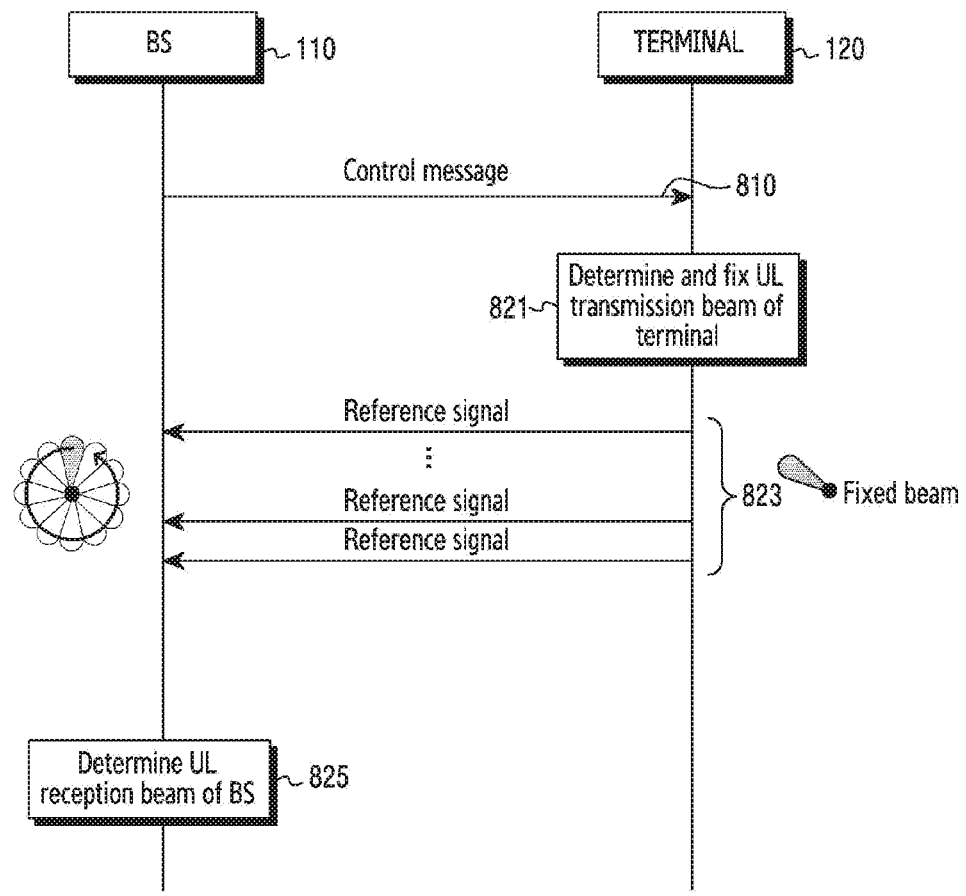
FIG. 8A illustrates an example of a beam search procedure of the BS and the terminal in a first operation mode according to various embodiments of the present disclosure.

FIG. 8A illustrates a beam search procedure of the BS and the terminal in the first operation mode according to various embodiments of the present disclosure. The BS may be the BS 110 of FIG. 1. The terminal may be the terminal 120 of FIG. 1.

Referring to FIG. 8A, in step 810, the terminal 120 may receive a control message indicating the first operation mode. The terminal 120 may perform a beam search procedure according to an instruction of the control message. For example, the terminal 120 may be pre-configured to perform a particular beam search result when receiving the control message. In another example, the control message specifically indicates an individual operation of the beam search procedure to be performed by the terminal 120, and the terminal 120 may perform the beam search procedure according to the control message.

As the terminal 120 receives the control message, the terminal 120 may determine an uplink transmission beam and fix the determined beam in step 821. More specifically, the terminal 120 may determine a downlink reception beam used in the downlink as the uplink transmission beam of the terminal 120 and fix the uplink transmission beam. The fixed beam may be used for reference signal transmission.

In step 823, the terminal 120 may transmit reference signals to the BS 110 through the fixed uplink transmission beam. The BS 110 may receive the reference signals from the terminal 120 through a plurality of respective reception beams. More specifically, the terminal 120 may continuously transmit the reference signals and the BS 110 may receive the reference signals through the plurality of reception beams while continuously changing the direction of reception beams. That is, the BS 110 may receive the reference signals through a beam sweep operation. When the BS 110 receives the reference signals for all the plurality of reception beams, the BS 110 may end the beam sweep operation.

At this time, the transmission beam of the terminal 120 is the fixed uplink transmission beam, and the BS 110 may determine the number of received reference signals in consideration of only the number of reception beams. For example, when the number of plurality of reception beams of the BS 110 is NB, the number of used transmission beams is 1, so that the BS 110 may receive NB (NB×1) reference signals in order to select the best beam.

In step 825, the BS 110 may determine the uplink reception beam based on the received reference signals. For example, the BS 110 may determine the uplink reception beam according to at least one of an RSSI indicating the received strength of the received reference signals, RSRQ indicating a reception quality, and RSRP indicating reception power. The RSRP may be referred to as beam reference signal received power (BRSRP).

Figure 8B:
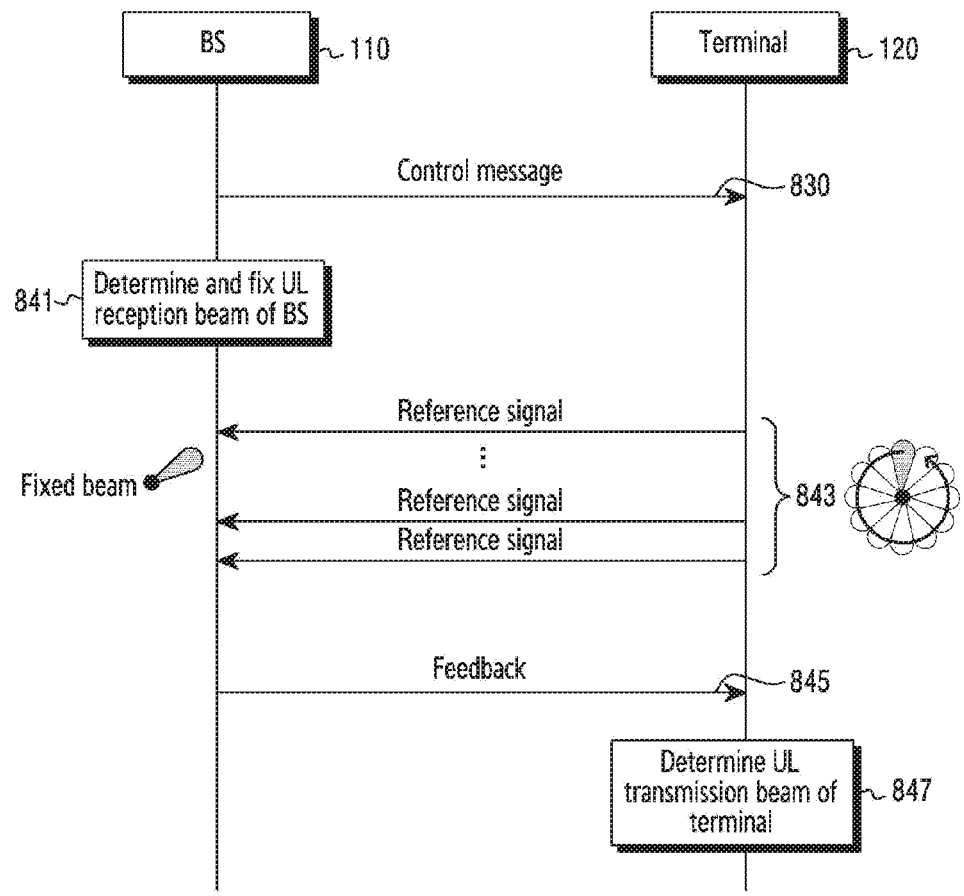
FIG. 8B illustrates an example of a beam search procedure of the BS and the terminal in a second operation mode according to various embodiments of the present disclosure.

FIG. 8B illustrates a beam search procedure of the BS and the terminal in the second operation mode according to various embodiments of the present disclosure. The BS may be the BS 110 of FIG. 1. The terminal may be the terminal 120 of FIG. 1.

Referring to FIG. 8B, in step 830, the BS 110 may transmit a control message indicating the second operation mode. The terminal 120 may perform a beam search procedure according to an instruction of the control message.

In step 841, the BS 110 may determine an uplink reception beam of the BS 110 and fix the determined beam. More specifically, the BS 110 may determine a downlink transmission beam as the uplink transmission beam and fix the uplink transmission beam. Although FIG. 8B illustrates that the control message is transmitted and then the uplink reception beam is determined, the operation order may be changed. That is, the BS 110 may transmit the control message after determining the uplink reception beam.

In step 843, the terminal 120 may transmit a plurality of reference signals to the BS 110. More specifically, the terminal 120 may transmit the reference signals while changing the transmission beam as well as continuously transmitting the reference signals. That is, the terminal 120 may transmit the plurality of reference signals through the beam sweep operation. The BS 110 may receive the plurality of reference signals from the terminal 120 through the fixed uplink transmission beam.

Since the reception beam of the BS 110 is the fixed uplink reception beam, the BS 110 may determine the number of received reference signals in consideration of only the number of transmission beams. For example, when the number of plurality of transmission beams of the terminal 120 is NUE, the number of used reception beam is 1, so that the BS 110 may receive NUE (NUE×1) reference signals in order to select the best beam.

In step 845, the BS 110 may transmit feedback information generated based on the received reference signals to the terminal 120. The BS 110 may generate the feedback information based on at least one piece of power information, quality information, and channel information of the received reference signals. In some embodiments, the BS 110 may select one of the received reference signals based on at least one piece of the power information, the quality information, and the channel information. The BS 110 may generate the feedback information containing an index corresponding to the selected reference signal. For example, the index may correspond to 9 bits. In other embodiments, the BS 110 may generate the feedback information containing power information (BRSRP) corresponding to each reference signal. For example, the BRSRP may correspond to 7 bits.

The BS 110 may transmit the generated feedback information before the next data transmission (for example, PUSCH transmission) of the terminal 120 scheduled in the terminal 120.

In step 847, the terminal 120 may determine the uplink transmission beam of the terminal 120 based on the feedback information. In some embodiments, the BS 110 may determine the beam corresponding to one of at least one index indicated by the feedback information as the uplink transmission beam. In other embodiments, the BS 110 may determine BRSRP having the largest value among the BRSRP contained in the feedback information as the uplink transmission beam.

Figure 8C:
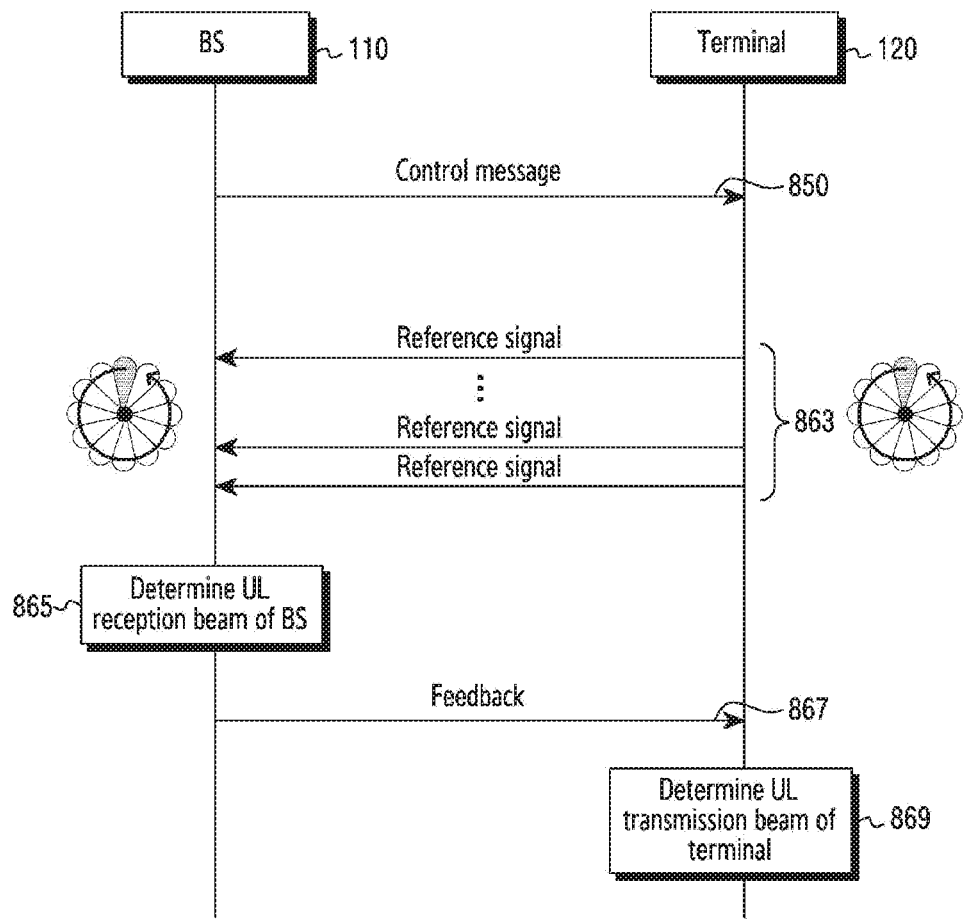
FIG. 8C illustrates an example of a beam search procedure of the BS and the terminal in a third operation mode according to various embodiments of the present disclosure.

FIG. 8C illustrates a beam search procedure of the BS and the terminal in the third operation mode according to various embodiments of the present disclosure. The BS may be the BS 110 of FIG. 1. The terminal may be the terminal 120 of FIG. 1.

Referring to FIG. 8C, in step 850, the terminal 120 may receive a control message indicating the third operation mode. The terminal 120 may perform a beam search procedure according to an instruction of the control message.

As the terminal 120 receives the control message indicating the third operation mode, the terminal 120 may transmit a plurality of reference signals to the BS 110 in step 863. The terminal 120 may transmit the plurality of reference signals through a plurality of transmission beams. The BS 110 may transmit the plurality of reference signals through a plurality of reception beams. More specifically, the terminal 120 may transmit the plurality of reference signals while continuously changing each of the plurality of transmission beams. The BS 110 may receive the plurality of reference signals while continuously changing each of the plurality of reception beams.

At this time, unlike the first operation mode and the second operation mode, the third operation mode does not have the fixed beam, so that the sweep for the BS 110 and all the beams of the BS 110 may be required. For example, when the total number of beams supported by the BS 110 is NB and the total number of beams supported by the terminal 120 is NUE, the BS 110 may receive at least NB×NUE reference signals in order to select the best beam.

In step 865, the BS 110 may determine the uplink reception beam based on the received reference signals. For example, the BS 110 may determine one of the reference signals according to a magnitude value of BRSRP of the NB×NUE reference signals and determine a reception beam corresponding to the determined reference signal as the uplink reception beam.

In step 867, the BS 110 may transmit feedback information generated based on the received reference signals to the terminal 120. The feedback information may contain an index for each of the reference signals or values for received power. The index may be an index of the beam corresponding to each reference signal. The value for power may be RSRP (that is, BRSRP) corresponding to each reference signal.

In step 869, the terminal 120 may determine the uplink transmission beam of the terminal 120 based on the feedback information. The terminal 120 may determine the uplink transmission beam in a similar way to that of step 847 in the second operation mode.

As described above, the BS 110 and the terminal 120 according to various embodiments may simplify the beam search procedure through the beam correspondence determination. For example, when the BS 110 does not determine the possibility of the use of beam correspondence, the BS 110 is required to receive the NUE×NB reference signals. That is, by receiving reference signals for all available beam combinations, the BS 110 and the terminal 120 may determine each of the transmission beam and the reception beam for data transmission. However, when the BS 110 uses beam correspondence, the beam search procedure for discovering the best beam of the BS 110 may be omitted. In the case of second operation mode, the BS 110 may be required to receive NUE reference signals in order to discover the best beam of the BS 110. In other words, the BS 110 and the terminal 120 may save a time spent for determining the beam for data transmission through the operation mode using beam correspondence.

Figure 9:
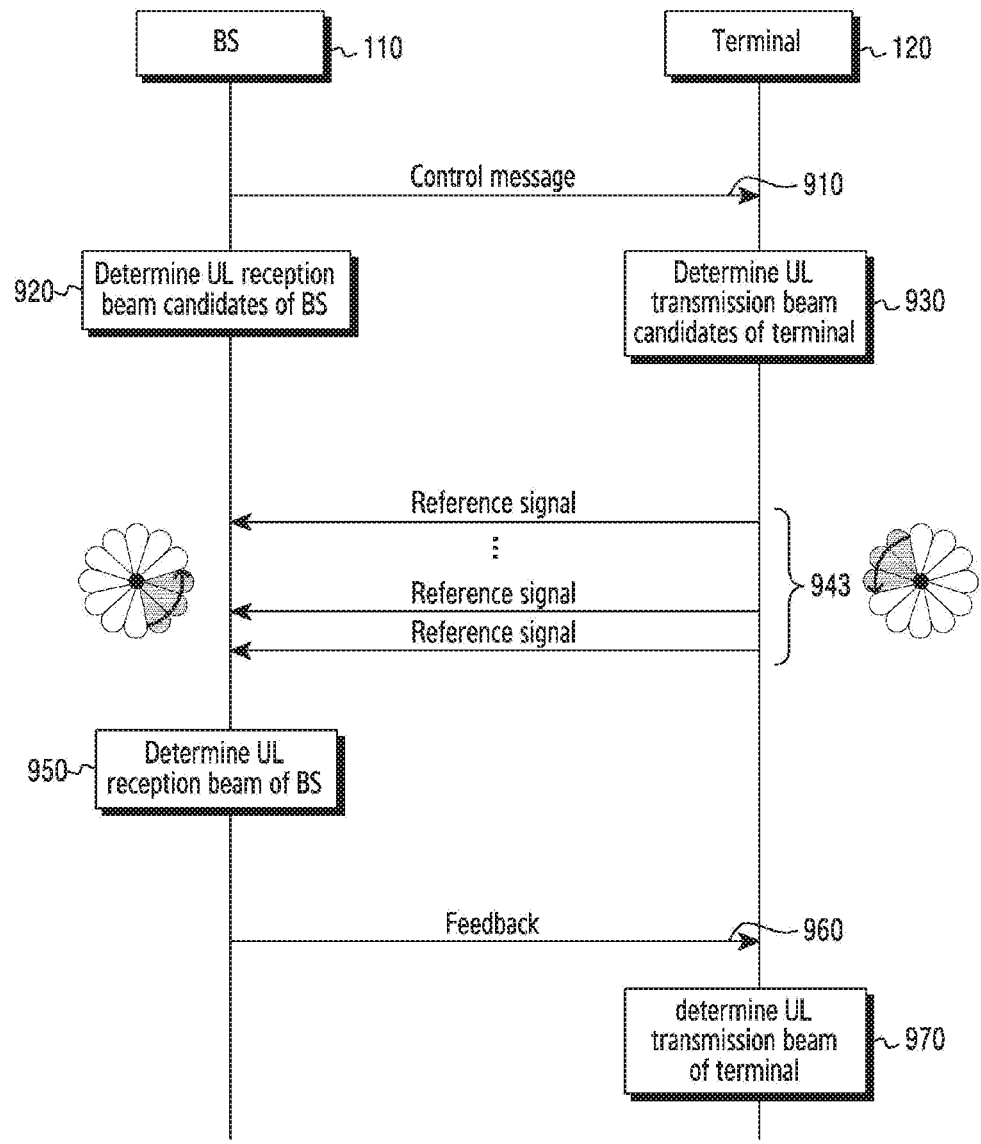
FIG. 9 illustrates another example of beam search procedure of the BS and the terminal according to various embodiments of the present disclosure.

FIG. 9 illustrates an example of another beam search procedure of the BS and the terminal according to various embodiments of the present disclosure. FIG. 9 illustrates the case in which the BS sweeps reception beams and the terminal sweeps transmission beams, that is, the case in which both the BS and the terminal search the uplink beam. The BS may be the BS 110 of FIG. 1. The terminal may be the terminal 120 of FIG. 1.

Referring to FIG. 9, in step 910, the BS 110 may transmit a control message to the terminal 120. The control message may contain indication information indicating a range of available beams as well as information on the possibility of the use of beam correspondence (for example, operation mode). Although the case in which both the BS 110 and the terminal 120 cannot use beam correspondence (for example, third operation mode) is described below, the present disclosure is not limited thereto.

In step 920, the BS 110 may determine uplink reception beam candidates of the BS 110. When it is determined that the BS 110 cannot use beam correspondence, the BS 110 may determine uplink reception beam candidates. The BS 110 may determine adjacent beams of the downlink transmission beam as the uplink reception beam candidates. Although the downlink transmission beam is not determined as the uplink reception beam, the BS 110 may determine one of the adjacent beams of the downlink transmission beams as the uplink reception beam. More specifically, when downlink data transmission is performed using a fifth beam among a total of 32 beams, the BS 110 may determine a beam near the fifth beam as the uplink reception beam even though beam correspondence is not used. This is because, when there is no detection of a movement of the terminal 120 at a range or wider, little change in a beam direction may be predicted. In another example, when the distance between the transmission antenna and the reception antenna of the BS 110 is within a predetermined range, little change in a beam direction may be predicted, so that the BS 110 may select one of the beams adjacent to the downlink transmission beams and determine the selected beam as the uplink reception beam. The adjacent beams may be referred to as reception beam candidates.

In some embodiments, the range of the reception beam candidates may be set as a predetermined value. For example, the BS 110 may determine fixed adjacent two beams as the adjacent beams. When the BS 110 transmits downlink data to the terminal 120 through a no. 7 beam among twelve beams ranging from no. 1 to no. 12 beams, the BS 110 may determine nos. 5, 6, 8, and 9 beams as candidate beams for uplink data reception.

In other embodiments, the range of the reception candidate beams may be adaptively set. For example, the range of the reception beam candidates may be determined according to the distance between the transmission antenna and the reception antenna of the BS 110. The range of the reception beam candidates may be determined according to the distance between the transmission antenna used for downlink data transmission by the BS 110 and the reception antenna to be used for uplink data reception by the BS 110. When the distance between the transmission antenna and a first reception antenna of the BS 110 is 3 and the distance between the transmission antenna and a second reception antenna of the BS 110 is 7, the BS 110 may determine different numbers of reception beam candidates according to whether the first reception is used with the terminal 120 or the second reception antenna is used.

In step 930, the terminal 120 may determine uplink transmission beam candidates of the terminal 120. When it is determined that the terminal 120 cannot use beam correspondence, the terminal 120 may perform the beam search procedure for determining the uplink beam. When a predetermined condition is satisfied, the terminal 120 may determine one of the adjacent beams of the downlink reception beam as the uplink transmission beam although the downlink reception beam is not determined as the uplink transmission beam. The adjacent beams may be referred to as the uplink transmission beam candidates. The terminal 120 may determine transmission beam candidates of the terminal 120 in a similar way to the procedure in which the BS 110 determines the reception beam candidates in step 920. For example, the terminal 120 may determine the transmission beam candidates according to the distance between the transmission antenna and the reception antenna included in the terminal 120 and the beam used in the downlink.

In step 943, the terminal 120 may transmit a plurality of reference signals to the BS 110. More specifically, the terminal 120 may continuously transmit the plurality of reference signals while changing the uplink transmission beam candidates of the terminal 120 one by one. The BS 110 may continuously transmit the plurality of reference signals while changing the uplink reception beam candidates one by one. When the number of uplink reception beam candidates is NB, candidate and the number of uplink transmission beam candidates is NUE, candidate, the BS 110 may receive at least NB, candidate×NUE, candidate reference signals in order to select the best beam. That is, the BS 110 may determine the best uplink reception beam by receiving the smaller number of reference signals compared to the third operation mode of FIG. 8C.

In step 950, the BS 110 may determine the uplink reception beam among the uplink reception beam candidates based on the received reference signals. For example, the BS 110 may determine a beam corresponding to the largest BRSRP among the uplink reception beam candidates as the uplink reception beam.

In step 960, the BS 110 may transmit feedback information generated based on the received reference signals to the terminal 120. The feedback information may contain an index for each of the reference signals or values for received power.

In step 970, the terminal 120 may determine the uplink transmission beam of the terminal 120 among the uplink transmission beam candidates based on the received feedback information. The terminal 120 may determine the uplink transmission beam in a similar way to that of step 847 in FIG. 8B.

FIG. 9 illustrates the case in which both the BS and the terminal determine the uplink beam, that is, the case of third operation mode. However, according to other embodiments of the present disclosure, an embodiment of reducing beam candidates can be applied to the first operation mode or the second operation mode. In other words, when the BS 110 can use beam correspondence but the terminal 120 cannot use beam correspondence (for example, the second operation mode), the terminal 120 may set the range of the uplink transmission beam of the terminal 120 to be discovered according to the control message as a particular range. When the BS 110 cannot use beam correspondence (for example, the first operation mode), the BS 110 can set the range of the uplink reception beam of the BS 110 as a predetermined range. As described above, although the BS 110 and the terminal 120 cannot use beam correspondence, one of the adjacent beams of the beam used in the downlink may be determined as the beam to be used in the uplink. The BS 110 and the terminal 120 may reduce a time spent for discovering the beam by setting candidates of beam combinations rather than performing reference signal transmission and the feedback procedure for all beam combinations.

FIGS. 5 to 9 have described that it is possible to decrease transmission of unnecessary reference signals and reduce the time spent for selecting the best beam for reference signal and data transmission by determining the antenna design, the array, and the configuration of the BS 110 and the terminal 120.

Hereinafter, FIGS. 10 to 12 describe channel estimation using channel reciprocity. Although FIGS. 10 to 12 describe, as an example, the case in which a result of uplink channel estimation is used for downlink data transmission when channel reciprocity is used, the case in which a result of downlink channel estimation is used for uplink data transmission can be applied.

Figure 10:
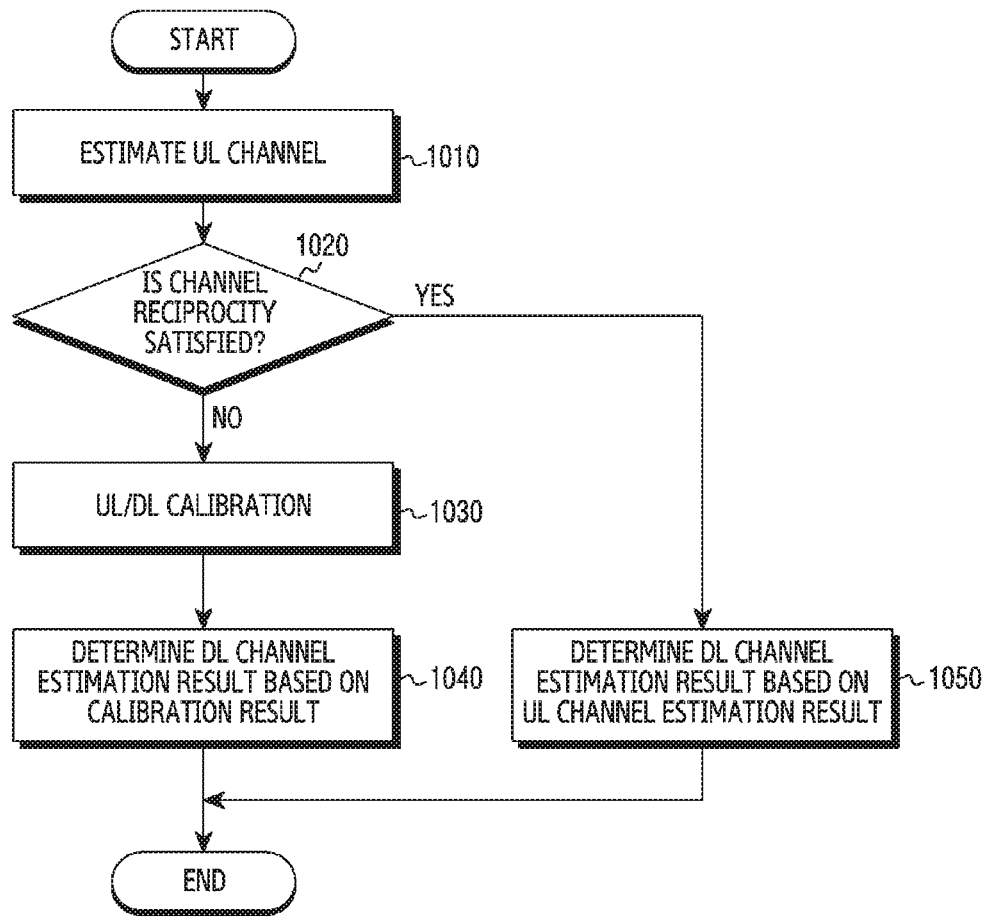
FIG. 10 illustrates a flowchart of a process of channel estimation by the BS according to various embodiments of the present disclosure.

FIG. 10 is a flowchart illustrating a process of channel estimation by the BS according to various embodiments of the present disclosure. The BS may be the BS 110 of FIG. 1.

Referring to FIG. 10, in step 1010, the BS 110 may perform uplink channel estimation. More specifically, the BS 110 may transmit a request for an uplink SRS to the terminal 120 for the uplink channel estimation. In response to the request, the terminal 120 may transmit the uplink SRS to the BS 110. The BS 110 may estimate a channel from the terminal 120 to the BS 110 in response to the reception of the uplink SRS. The BS 110 may determine a parameter for the channel based on a result of the channel estimation. The parameter for the channel may include attenuation occurring in signal transmission, a phase shift, or a time delay. The parameter for the channel may include a precoding vector (or matrix). The BS 110 may store the result of the uplink channel estimation.

In step 1020, the BS 110 may determine whether channel reciprocity with the terminal 120 is satisfied. The BS 110 may use channel reciprocity for the BS 110, and, when the use of channel reciprocity for the terminal 120 is possible, determine that channel reciprocity is satisfied. In some embodiments, when the antenna of the BS 110 used for uplink channel estimation is the transmission/reception common antenna in a communication system (for example, TDD) in which there is little frequency change according to uplink/downlink switching, the BS 110 may determine that channel reciprocity for the BS 110 can be used. The BS 110 may receive channel capability information from the terminal 120 and determine whether channel reciprocity for the terminal 120 can be used based on the channel capability information.

In step 1030, the BS 110 may perform calibration in order to determine a result of the downlink channel estimation. When the reception antenna used for uplink channel estimation of the BS 110 is different from the reception antenna to be used for downlink transmission, the BS 110 may determine a compensation value for antenna separation of the BS 110. The BS 110 may determine a compensation value according to a difference in the physical configuration between the transmission antenna and the reception antenna. The difference in the physical configuration may be a path difference between a transmission side line and a reception side line, a difference and an error in a delay time occurring in each of the lines, or an impulse response by each of the lines.

The BS 110 may perform the calibration by transmitting a calibration signal and receiving the calibration signal. The BS 110 may compensate for a gap between the uplink channel and the downlink channel through a channel response to the calibration signal. The calibration signal may be referred to as a training signal or a training sequence.

The BS 110 may receive a compensation value for the terminal 120 from the terminal 120. The compensation value for the terminal 120 may be a compensation value for antenna separation of the terminal 120. The compensation value for the antenna separation of the terminal 120 may be determined in a similar way as that of the compensation value for the antenna separation of the BS 110. The terminal 120 may determine the compensation value for the terminal 120 by transmitting and receiving a calibration signal.

In step 1040, the BS 110 may determine the result of the downlink channel estimation based on the calibration result. That is, the BS 110 may determine the result of the downlink channel estimation by reflecting the compensation value in step 1030 in the result of the uplink channel estimation. For example, the compensation value may be at least one of the compensation value for the antenna separation of the BS 110 and the compensation value for the antenna separation of the terminal 120.

When the BS 110 determines that channel reciprocity is satisfied, the BS 110 may determine the result of the downlink channel estimation based on the result of the uplink channel estimation in step 1050. For example, the BS 110 may transpose the uplink channel response as shown in the following equation to acquire a downlink channel response.

$$H_{DL}=(H_{UL})^T \qquad \text{Equation (1)}$$

$H_{DL}$ denotes a downlink channel response, and $H_{UL}$ denotes an uplink channel response.

The uplink channel response and the downlink channel response may be acquired in a matrix form. The BS 110 may determine a precoding matrix to be used for downlink data transmission based on the acquired downlink channel response.

In another example, the BS 110 may determine the precoding matrix to be used for downlink data transmission based on a precoding matrix used for uplink channel estimation. Since channel reciprocity is satisfied, the BS 110 may determine a precoding scheme without separate downlink reference signal transmission.

Figure 11:
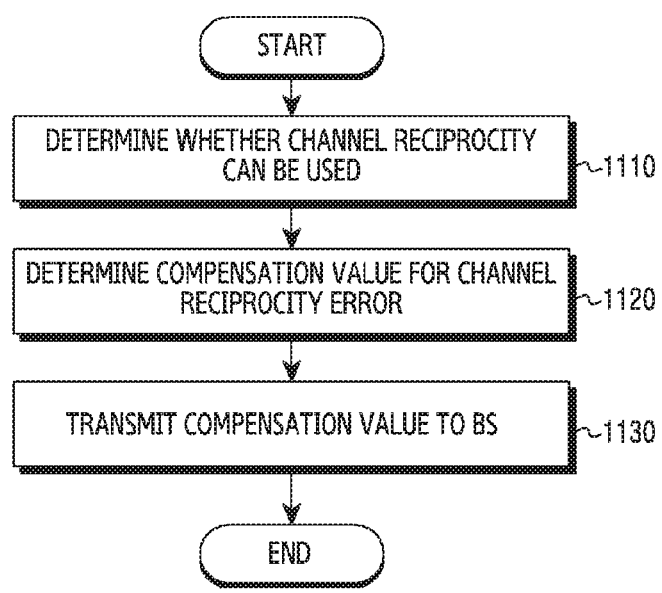
FIG. 11 illustrates a flowchart of a process of channel estimation by the terminal according to various embodiments of the present disclosure.

FIG. 11 is a flowchart illustrating a process of channel estimation by the terminal according to various embodiments of the present disclosure. The terminal may be the terminal 120 of FIG. 1.

Referring to FIG. 11, in step 1110, the terminal 120 may determine whether reciprocity for the terminal 120 can be used. In some embodiments, the terminal 120 may determine channel reciprocity for the terminal 120 can be used according to whether the antenna used for uplink channel estimation is the transmission/reception common antenna or the transmission antenna. For example, when the antenna used for uplink channel estimation is the transmission antenna and the reception antenna is separately provided, the terminal 120 may determine that channel reciprocity for the terminal 120 can be used.

In step 1120, the terminal 120 may determine a compensation value for a channel reciprocity error. The channel reciprocity error may refer to a difference between a channel response in uplink channel estimation and a channel response in downlink channel estimation. The channel reciprocity error may occur according to the separated design of the reception antenna. The compensation value may be a compensation value for the antenna separation of the terminal 120. The terminal 120 may determine a compensation value for the reciprocity error within the terminal 120 by transmitting a calibration signal through the transmission antenna and receiving the calibration signal through the reception antenna. For example, the terminal 120 may calculate an impulse response with a transmission side for transmitting the calibration signal and an impulse response within a reception side for receiving the calibration signal. The transmission side performs an analog control on the transmission antenna of the terminal 120, and the reception side performs an analog control on the reception antenna of the terminal 120. The terminal 120 may acquire the channel response, which is the result of the downlink channel estimation by reflecting the impulse response in the channel response of the uplink channel estimation.

In step 1130, the terminal 120 may transmit the compensation value determined in step 1120 to the BS 110. In some embodiments, the terminal 120 may transmit the compensation value through UE capability information. The compensation value may be the compensation value for the antenna separation of the terminal 120. Whether the transmission antenna and the reception antenna of the terminal 120 are separated from each other and the line impulse response within each of the transmission side and the reception side of the terminal 120 may be set in a process of manufacturing the terminal 120. Accordingly, the terminal 120 may store in advance the compensation value for the antenna separation of the terminal 120. The terminal 120 may transmit the compensation value for the antenna separation to the BS 110 in initial access to the BS 110.

In other embodiments, the terminal 120 may transmit the compensation value through a medium access control (MAC) Control Element (CE). The MAC CE is used for MAC layer control signaling between the BS 110 and the terminal 120. The terminal 120 may set a logical channel identifier (LCID) for the compensation value to configure the MAC CE. The terminal 120 may transmit the MAC CE to the BS 110 through an uplink-shared channel (UL-SCH).

In other embodiments, the terminal 120 may transmit the compensation value through a separate procedure. For example, the BS 110 may transmit DCI indicating transmission of the compensation value to the terminal 120 through a physical downlink control channel (PDCCH). The terminal 120 may transmit the compensation value through a physical uplink control channel (PUCCH) or a physical uplink shared channel (PUSCH) after decoding the DCI. That is, the terminal 120 may transmit the compensation value in a similar way to the general data transmission operation.

Figure 12:
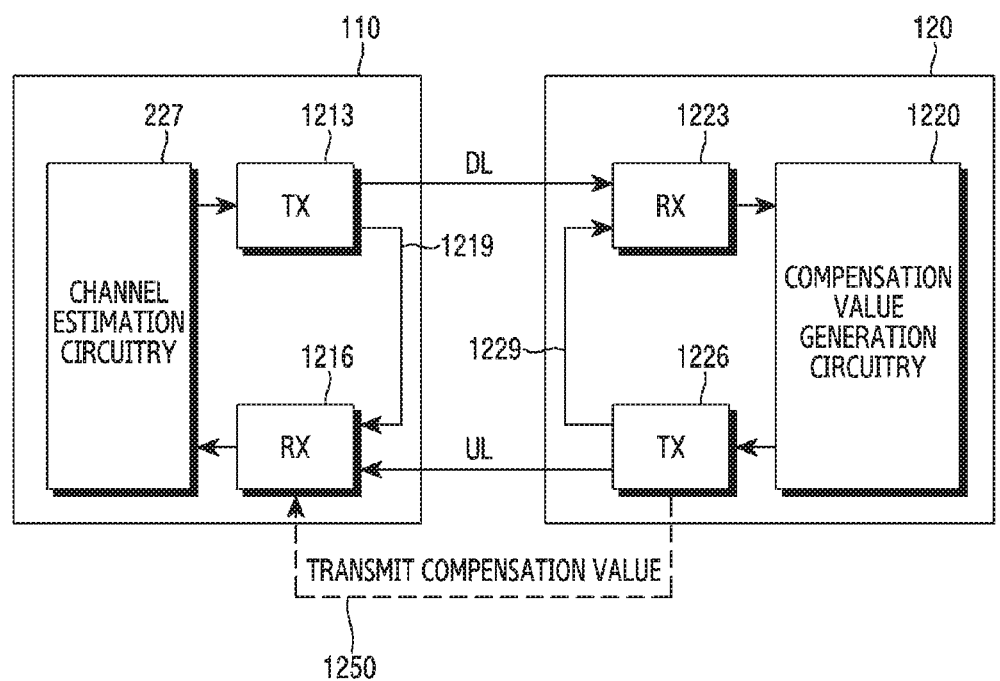
FIG. 12 illustrates an example of compensation according to various embodiments of the present disclosure.

FIG. 12 illustrates an example of compensation according to various embodiments of the present disclosure.

Referring to FIG. 12, the terminal 120 may transmit an uplink signal to the BS 110. The uplink signal is transmitted through a transmission path 1226 of the terminal 120, transmitted through an uplink wireless channel, and then transmitted through a reception path 1216 of the BS 110. That is, the uplink signal may pass through three channels while being transmitted to the BS 110 from the terminal 120. Similarly, when the BS 110 transmits a downlink signal to the terminal 120, the downlink signal may pass through three channels, such as a transmission path 1213 of the BS 110, a downlink wireless channel, and a reception path 1223 of the terminal 120.

In the case of all uplink channels, the channel through which the uplink signal passes may be expressed as equation (2) below.

$$H_{UL}=H_{B,Rx} \times H_{UL,air} \times H_{UE,Tx} \quad \text{Equation(2)}$$

$H_{UL}$ denotes a channel response for all uplink channel through which the uplink signal passes. $H_{UE,Tx}$ denotes an impulse response in the transmission path 1226 of the terminal 120. $H_{UL,air}$ denotes a wireless channel on the air from the terminal 120 to the BS 110. $H_{B,Rx}$ denotes an impulse response in the reception path 1216 of the BS 110.

In the case of all downlink channels, a channel through which the downlink signal passes may be expressed as the following equation.

$$H_{DL}=H_{UE,Rx} \times H_{DL,air} \times H_{B,Tx} \quad \text{Equation (3)}$$

$H_{DL}$ denotes a channel response for all downlink channels through which the downlink signal passes. $H_{B,Tx}$ denotes an impulse response in the transmission path 1213 of the BS 110. $H_{DL,air}$ denotes a channel response for a wireless channel on the air from the BS 110 to the terminal 120. $H_{UE,Rx}$ denotes an impulse response in the reception path 1223 of the terminal 120.

In the case in which there is little frequency change within the uplink channel and the downlink channel like the TDD communication system, the wireless channel on the air may satisfy channel reciprocity. That is, $H_{DL,air}$ and $H_{UL,air}$ may establish a transposed relation therebetween. However, as the transmission path 1213 and the reception path 1216 are separately implemented in the BS 110, the transposed relation may not be established between the impulse response in the transmission path 1213 and the impulse response in the reception path 1216. Accordingly, the BS 110 may determine that channel reciprocity for the BS 110 cannot be used. Similarly, as the transmission path 1226 and the reception path 1223 of the terminal 120 are separated from each other, the terminal 120 may determine that channel reciprocity for the terminal 120 cannot be used.

Since channel reciprocity for the BS 110 cannot be used, the BS 110 may compensate for a reciprocity error of the corresponding channel. The BS 110 may transmit a calibration signal 1219 in order to compensate for the reciprocity error of the corresponding channel. The BS 110 may acquire the impulse response $H_{B,Tx}$ of the transmission path 1213 and the impulse response $H_{B,Rx}$ of the reception path 1216 without the channel response for the wireless channel on the air by transmitting and receiving the calibration signal 1219. More specifically, the BS 110 may transmit the calibration signal 1219 through the transmission path 1213 and receive the calibration signal 1219 through the reception path 1216. The BS 110 may transmit and receive the calibration signal 1219 without passing through the wireless channel with the terminal 120. The BS 110 may acquire a first compensation response $H_{B,Rx} \times H_{B,Tx}$ of the transmission path 1213 and the reception path 1216 through the transmission of the calibration signal 1219. Similarly, the terminal 120 may acquire a second compensation response $H_{UE,Rx} \times H_{UE,Tx}$ of the transmission path 1226 and the reception path 1223 through the transmission of the calibration signal 1229.

When determining the downlink channel estimation result (for example, $H_{DL}$) based on the uplink channel estimation result (for example, $H_{UL}$), the BS 110 may transpose the uplink channel estimation and then reflect the compensation value (for example, $H_{B,Rx} \times H_{B,Tx}$) of the BS 110 and the compensation value (for example, $H_{UE,Rx} \times H_{UE,Tx}$) of the terminal 120 so as to determine the downlink channel estimation result.

FIG. 12 illustrates that the channel reciprocity error is compensated for both the BS 110 and the terminal 120, the present disclosure is not limited thereto. That is, when the transmission antenna and the reception antenna of the BS 110 are separated from each other but the terminal 120 transmits and receives data to and from the BS 110 through the transmission/reception common antenna, the BS 110 may determine the downlink channel estimation result by determining only the compensation value for the reciprocity error of the BS 110.

According to whether the antennas used for uplink channel estimation with the terminal 120 are transmission/reception common antennas, the BS 110 may omit the channel estimation procedure. For example, when it is determined that the BS 110 and the terminal 120 can use channel reciprocity as all the antennas are the transmission and/or reception common antennas, the BS 110 may omit a procedure for transmitting reference signals for downlink channel estimation. The BS 110 may determine the downlink channel estimation result based on the uplink channel estimation result without the reference signal transmission and the feedback procedure. The BS 110 may efficiently use resources for channel estimation and resources for data transmission in a resource block by omitting the procedure for transmitting the reference signals. In another example, when the antenna of the terminal 120 is not the transmission/reception common antenna, the BS 110 may determine the downlink channel estimation result based on the compensation value for the antenna separation acquired from the terminal 120 and the uplink channel estimation value. Similarly, the BS 110 may promote the efficient use of resources by omitting the reference signal transmission and the feedback procedure. That is, the BS 110 and the terminal 120 may decrease unnecessary reference signal transmission and reduce the time for data transmission by determining whether channel reciprocity can be used according to the design and array of used antennas.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a base station (BS) in a wireless communication system, the method comprising:
    transmitting, to a user equipment (UE), a capability enquiry message;
    receiving, from the UE, capability information as a response to the capability enquiry message, the capability information including information for indicating whether a selection of an uplink transmission beam of the UE without an uplink beam sweeping is available in the UE or not;
    if the selection of the uplink transmission beam of the UE without the uplink beam sweeping is available, identifying that the UE is available to select the uplink transmission beam of the UE based on downlink measurements without the uplink beam sweeping; and
    if the selection of the uplink transmission beam of the UE without the uplink beam sweeping is unavailable, identifying that the UE is available to select the uplink transmission beam of the UE based on the uplink beam sweeping.

2. The method of claim 1, wherein the capability information includes one bit indicating whether the selection without the uplink beam sweeping is available or not.

3. The method of claim 1, further comprising:
    transmitting, to the UE, a control message for indicating an operation mode for configuring an uplink beam search procedure,
    wherein the operation mode is associated with the capability information.

4. The method of claim 1, further comprising:
    if the selection of the uplink transmission beam of the UE without the uplink beam sweeping is unavailable, receiving, from the UE, sounding reference signals (SRSs) associated with uplink transmission beams of the UE; and
    transmitting, to the UE, feedback information for indicating the uplink transmission beam of the UE.

5. A method performed by a user equipment (UE) in a wireless communication system, the method comprising:
    receiving, from a base station (BS), a capability enquiry message; and
    transmitting, to the BS, capability information in response to the capability enquiry message, the capability information including information for indicating whether a selection of an uplink transmission beam of the UE without an uplink beam sweeping is available in the UE or not,
    wherein the selection of the uplink transmission beam of the UE without the uplink beam sweeping is available if the UE is available to select the uplink transmission beam of the UE based on downlink measurements without the uplink beam sweeping, and
    wherein the selection of the uplink transmission beam of the UE without the uplink beam sweeping is unavailable if the UE is available to select the uplink transmission beam of the UE based on the uplink beam sweeping.

6. The method of claim 5,
    wherein the capability information of the UE includes one bit indicating whether the selection of the uplink transmission beam of the UE without the uplink beam sweeping is available or not.

7. The method of claim 5, further comprising:
    if the selection of the uplink transmission beam of the UE without the uplink beam sweeping is unavailable, transmitting, to the BS, sounding reference signals (SRSs) based on uplink transmission beams of the UE; and
    receiving, from the BS, feedback information for indicating the uplink transmission beam of the UE.

8. The method of claim 5, further comprising:
    receiving, from the BS, a control message for indicating an operation mode for configuring an uplink beam search procedure,
    wherein the operation mode is associated with the capability information.

9. A base station (BS) in a wireless communication system, the BS comprising:
    at least one transceiver; and
    at least one processor operatively coupled to the at least one transceiver, configured to:
        control the at least one transceiver to transmit, to a user equipment (UE), a capability enquiry message;
        control the at least one transceiver to receive, from the UE, capability information as a response to the capability enquiry message, the capability information including information for indicating whether a selection of an uplink transmission beam of the UE without an uplink beam sweeping is available in the UE or not;
        if the selection of the uplink transmission beam of the UE without the uplink beam sweeping is available, identify that the UE is available to select the uplink transmission beam of the UE based on downlink measurements without the uplink beam sweeping; and
        if the selection of the uplink transmission beam of the UE without the uplink beam sweeping is unavailable, identify that the UE is available to select the uplink transmission beam of the UE based on the uplink beam sweeping.

10. The BS of claim 9, wherein the capability information includes one bit indicating whether the selection of the uplink transmission beam of the UE without the uplink beam sweeping is available or not.

11. The BS of claim 9,
wherein the at least one processor is further configured to control the at least one transceiver to transmit a control message for configuring an uplink beam search procedure, and
wherein an operation mode is associated with the capability information.

12. The BS of claim 11, wherein the at least one processor is further configured to:
if the selection of the uplink transmission beam of the UE without the uplink beam sweeping is unavailable, control the at least one transceiver to receive, from the UE, sounding reference signals associated with uplink transmission beams of the UE; and
control the at least one transceiver to transmit, to the UE, feedback information for indicating the uplink transmission beam of the UE.

13. A user equipment (UE) in a wireless communication system, the UE comprising:
at least one transceiver; and
at least one processor operatively coupled to the at least one transceiver,
wherein the at least one processor is configured to:
control the at least one transceiver to receive, from a base station (BS), a capability enquiry message; and
control the at least one transceiver to transmit, to the BS, capability information in response to the capability enquiry message, the capability information including information for indicating whether a selection of an uplink transmission beam of the UE without an uplink beam sweeping is available in the UE or not,
wherein the selection of the uplink transmission beam of the UE without the uplink beam sweeping is available if the UE is available to select the uplink transmission beam of the UE based on downlink measurements without the uplink beam sweeping, and
wherein the selection of the uplink transmission beam of the UE without the uplink beam sweeping is unavailable if the UE is available to select the uplink transmission beam of the UE based on the uplink beam sweeping.

14. The UE of claim 13,
wherein the capability information of the UE includes one bit indicating whether the selection of the uplink transmission beam of the UE without the uplink beam sweeping is available or not.

15. The UE of claim 13, wherein the at least one processor is further configured to:
if the selection of the uplink transmission beam of the UE without the uplink beam sweeping is unavailable, control the at least one transceiver to transmit, to the BS, sounding reference signals (SRSs) based on uplink transmission beams of the UE; and
control the at least one transceiver to receive, from the BS, feedback information for indicating the uplink transmission beam of the UE.

16. The UE of claim 13,
wherein the at least one processor is further configured to control the at least one transceiver to receive, from the BS, a control message for indicating an operation mode for configuring an uplink beam search procedure, and
wherein the operation mode is associated with the capability information.

* * * * *